(12) United States Patent
Mizuno et al.

(10) Patent No.: US 7,519,869 B2
(45) Date of Patent: Apr. 14, 2009

(54) CONTROL OF STORAGE SYSTEM USING DISK DRIVE DEVICE HAVING SELF-CHECK FUNCTION

(75) Inventors: Makio Mizuno, Sagamihara (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 11/296,319

(22) Filed: Dec. 8, 2005

(65) Prior Publication Data
US 2007/0091497 A1 Apr. 26, 2007

(30) Foreign Application Priority Data
Oct. 25, 2005 (JP) .............................. 2005-309198

(51) Int. Cl.
*G06F 11/00* (2006.01)
(52) U.S. Cl. ................................. 714/42; 714/5; 714/25
(58) Field of Classification Search ............... 714/5, 714/25, 42
See application file for complete search history.

(56) References Cited

U.S. PATENT DOCUMENTS

| | | | | |
|---|---|---|---|---|
| 5,493,670 A | * | 2/1996 | Douglis et al. ............... 713/324 |
| 5,761,411 A | * | 6/1998 | Teague et al. ................ 714/47 |
| 5,815,650 A | * | 9/1998 | Apperley et al. ............. 714/6 |
| 5,819,100 A | * | 10/1998 | Pearce ......................... 713/323 |
| 5,832,199 A | * | 11/1998 | Apperley et al. ............. 714/6 |
| 6,198,590 B1 | * | 3/2001 | Codilian et al. .......... 360/73.03 |
| 6,401,214 B1 | * | 6/2002 | Li ................................. 714/6 |
| 6,405,329 B1 | * | 6/2002 | Colligan et al. ............. 714/57 |
| 6,408,406 B1 | * | 6/2002 | Parris ........................... 714/41 |
| 6,515,817 B1 | * | 2/2003 | Hamaguchi et al. ...... 360/73.03 |
| 6,600,614 B2 | * | 7/2003 | Lenny et al. ................. 360/31 |
| 6,771,440 B2 | * | 8/2004 | Smith .......................... 360/31 |
| 6,980,381 B2 | * | 12/2005 | Gray et al. .................... 360/31 |
| 7,246,105 B2 | * | 7/2007 | Numanoi et al. .............. 707/1 |
| 7,369,339 B2 | * | 5/2008 | Kojima et al. ................ 360/31 |
| 2002/0053046 A1 | * | 5/2002 | Gray et al. ................... 714/42 |
| 2002/0060868 A1 | * | 5/2002 | Lenny et al. .................. 360/31 |
| 2003/0112538 A1 | * | 6/2003 | Smith .......................... 360/31 |
| 2004/0260967 A1 | | 12/2004 | Guha et al. |
| 2005/0068025 A1 | * | 3/2005 | Escobar et al. .............. 324/212 |
| 2005/0262385 A1 | * | 11/2005 | McNeill et al. ................ 714/5 |
| 2006/0053338 A1 | * | 3/2006 | Cousins et al. ................ 714/6 |
| 2006/0090098 A1 | * | 4/2006 | Le et al. ........................ 714/6 |
| 2007/0067560 A1 | * | 3/2007 | Anzai et al. ................. 711/112 |

* cited by examiner

*Primary Examiner*—Robert Beausoliel
*Assistant Examiner*—Charles Ehne
(74) *Attorney, Agent, or Firm*—Mattingly, Stanger, Malur & Brundidge, P.C.

(57) ABSTRACT

Operation information related to at least one of an operating state of a disk drive device and an operating history of the disk drive device is obtained, and timing of the instruction to execute the testing process is determined based on a first operation information which is at least part of the operation information.

20 Claims, 17 Drawing Sheets

FIRST EMBODIMENT

Fig.5

THRESHOLD MANAGEMENT TABLE

126

| | CURRENT VALUE | THRESHOLD |
|---|---|---|
| NUMBER OF Spin-up TIMES | 6 | 5 |
| NUMBER OF Spin-down TIMES | 5 | 5 |
| NUMBER OF Power-on TIMES | 1 | 2 |
| NUMBER OF Power-off TIMES | 0 | 2 |
| NUMBER R/W TIMES | 500000 | 1000000 |
| Spin-up FREQUENCY | 2 | 5 |
| Spin-down FREQUENCY | 2 | 5 |
| Power-on FREQUENCY | 1 | 2 |
| Power-off FREQUENCY | 1 | 2 |
| R/W FREQUENCY | 0 | 3600 |
| CONTINUOUS OPERATING TIME | 20000 | 28800 |

THIRD EMBODIMENT

CHECK INTERVAL CONFIGURATION TABLE

| | CURRENT VALUE | THRESHOLD |
|---|---|---|
| CHECK INTERVAL | 1000 | 1440 |

/‾128

FOURTH EMBODIMENT

SIXTH EMBODIMENT

EIGHTH EMBODIMENT

CONTROL OF STORAGE SYSTEM USING DISK DRIVE DEVICE HAVING SELF-CHECK FUNCTION

CROSS-REFERENCE TO RELATED APPLICATIONS

The present application claims the priority based on Japanese Patent Application No. 2005-309198 filed on Oct. 25, 2005, the disclosure of which is hereby incorporated herein by reference in its entirety.

BACKGROUND

1. Field of the Invention

The invention relates to a technique for controlling a storage system using a disk drive device having a self-check function.

2. Description of the Related Art

Storage systems employing disk drive devices have been used conventionally. Some disk drive devices have a self-check (self-test) function. A known example of this function (technology) is SMART (Self monitoring Analysis and Reporting Technology). This type of self-check function is used when a disk drive is replaced (See, for example, U.S. Patent Published Application No. 2004/0260967).

Spin-up-state is the basic operating state of many disk drive devices provided in conventional storage systems. Accordingly self checks scarcely cause spin up of disk drive devices. Recently, meanwhile, some storage systems have made use of MAID (Massive Array of Inactive Disks) technology. In MAID, at least part of the disk drive devices with no access among a plurality of disk drive devices is spun down. MAID can be used to reduce power consumption, increase storage system density (space saving), and increase the life of disk drive devices. Self checks are done repeatedly to ascertain the most recent state of disk drive devices. However, self checks add to the load on disk drive devices. Self checks may thus shorten the life of disk drive devices. Particularly in storage systems employing MAID technology, self checks are sometimes accompanied by spin up or spin down, which can thus impose a significant burden on disk drive devices.

These types of problems are not limited to spin up or spin down during self checks but are also common to self checks without spin up or spin down. Such problems are also not limited to storage systems in which some disk drives are spun down, such as MAID, but are also common to storage systems in which the disk drive devices are not spun down at all.

SUMMARY

An object of the invention is to provide a technique capable of achieving a balance between reliability of self check result when making use of the self check result, and preventing the shortening of disk drive device life caused by such the self check.

In an aspect of the present invention, there is provided a storage system for providing a host computer with a data read/writable storage area. This storage system comprises a disk drive device, a test instruction module, a result obtaining module, and an operation information obtaining module. The disk drive device has a storage area and a testing module configured to execute a testing process for operation of the disk drive device. The test instruction module is configured to send an instruction to execute the testing process to the testing module. The result obtaining module is configured to obtain a result of the testing process. The operation information obtaining module is configured to obtain operation information related to at least one of an operating state of the disk drive device and an operating history of the disk drive device. Furthermore, the test instruction module has a first timing mode for determining a first timing to issue an instruction to execute the testing process, based on a first operation information which is at least part of the operation information.

In this storage system, a balance can be achieved between reliability of a self check result when making use of the self check result, and preventing the shortening of disk drive device life caused by such the self check, because the timing of the testing process is determined based on first operation information which is at least part of the operation information relating to at least one of the operating state of the disk drive device and the operating history of the disk drive device.

The present invention can be implemented in a variety of embodiments. For example, the invention can be realized in embodiments such as a method and a device for self check control, a computer program for realizing the functions of such methods and devices, a storage medium having such a computer program recorded thereon, and a data signal containing the computer program and embodied in a carrier wave, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 5 is an illustration of an example of a threshold management table 126;

DESCRIPTION OF THE PREFERRED EMBODIMENT

Embodiments of the invention are illustrated in the following order.
A: First Embodiment
B: Second Embodiment
C: Third Embodiment
D: Fourth Embodiment
E: Fifth Embodiment
F: Sixth Embodiment
G: Seventh Embodiment
H: Eighth Embodiment
I: Ninth Embodiment
J: Variants

A: First Embodiment

Figure 1:
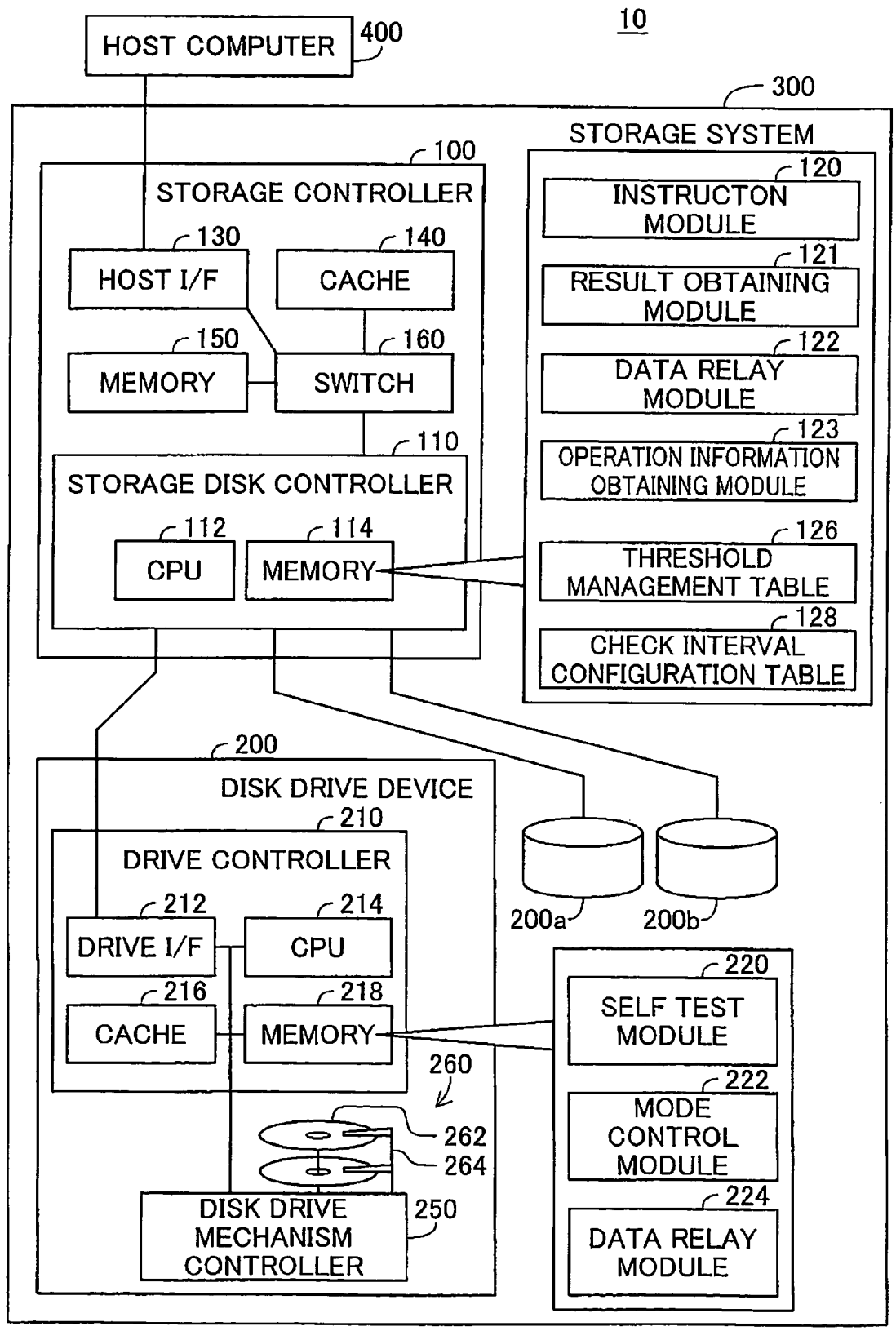
FIG. 1 is a schematic illustration of the structure of an embodiment of a data processing system according to the present invention.

FIG. 1 is a schematic illustration of the structure of an embodiment of a data processing system according to the present invention. The data processing system 10 has a host computer 400 and storage system 300 that are connected to each other. The storage system 300 provides data storage areas to the host computer 400. The host computer 400 executes the desired functions while using the storage areas that have been provided. Functions of the host computer 400 include the file server functions for providing data files to client devices (not shown), and the database server functions for controlling various types of data.

The storage system 300 has a storage controller 100 and a plurality of disk drive devices 200, 200a, and 200b connected to the storage controller 100. The storage controller 100 reads and writes data targeting the disk drive devices 200, 200a, and 200b according to requests from the host computer 400.

The storage controller 100 has a host interface (I/F) 130, cache memory 140, memory 150, storage disk controller 110, and switch 160.

The host I/F 130 is an interface for connecting with the host computer 400. The cache memory 140 is a semiconductor memory for temporarily storing data transmitted between the host computer 400 and the disk drive devices 200, 200a, and 200b. The memory 150 is a semiconductor memory for storing control data or management data in the storage system 300. The storage disk controller 110 functions as an interface to connect with the disk drive devices 200, 200a, and 200b. The switch 160 is connected with the above structural elements 110, 130, 140, and 150, and relays data communications between the structural elements.

The storage disk controller 110 has a CPU (central processing unit) 112 and memory 114. The memory 114 has an instruction module 120, result obtaining module 121, data relay module 122, operation information obtaining module 123, threshold management table 126, and check interval configuration table 128. The modules 120, 121, 122, and 123 are computer programs run by the CPU 112. Details of the modules are described below.

The data relay module 122 relays data transmission between the host computer 400 and the disk drive devices 200, 200a, and 200b according to requests from the host computer 400. Specifically, the data relay module 122 transmits read commands or write commands to the disk drive devices 200, 200a, and 200b according to the read or write commands from the host computer 400. In this first embodiment, a plurality of disk drive devices 200, 200a, and 200b forms the RAID (Redundant Array of Inexpensive Disks) system. The RAID system need not necessarily be used.

The disk drive device 200 has a drive controller 210, disk drive mechanism controller 250 connected to the drive controller 210, and a disk drive mechanism 260 connected to the disk drive mechanism controller 250. The drive controller 210 reads and writes data targeting the disk drive mechanism 260 by controlling the disk drive mechanism controller 250 according to requests from the storage disk controller 110. In this embodiment, control by the drive controller 210 is based on the ATA (AT Attachment) standards. However, the control may be based on other standards (such as the SCSI).

The disk drive mechanism 260 has a disk 262 as a storage area and a magnetic head 264. The magnetic head 264 reads and writes data targeting the rotating disk 262. The disk drive mechanism controller 250 has a spindle motor (not shown) that rotates the disk 262, and an actuator (not shown) that moves the magnetic head 264. The disk drive mechanism controller 250 drives the disk drive mechanism 260 according to requests from the drive controller 210.

The drive controller 210 has a drive interface (I/F) 212, a CPU 214, cache memory 216, and memory 218. The memory 218 stores a self-test module 220, a mode control module 222, and a data relay module 224. These modules 220, 222, and 224 are computer programs run by the CPU 214. The self-test module 220 tests the operation of the disk drive device 200. The mode control module 222 controls the operating mode of the drive controller 210. The data relay module 224 reads and writes data targeting the disk drive mechanism 260 according to requests from the storage disk controller 110. Details on the modules are given below.

The structure of the other disk drive devices 200a and 200b is the same as that of the disk drive device 220 described above.

Figure 2:
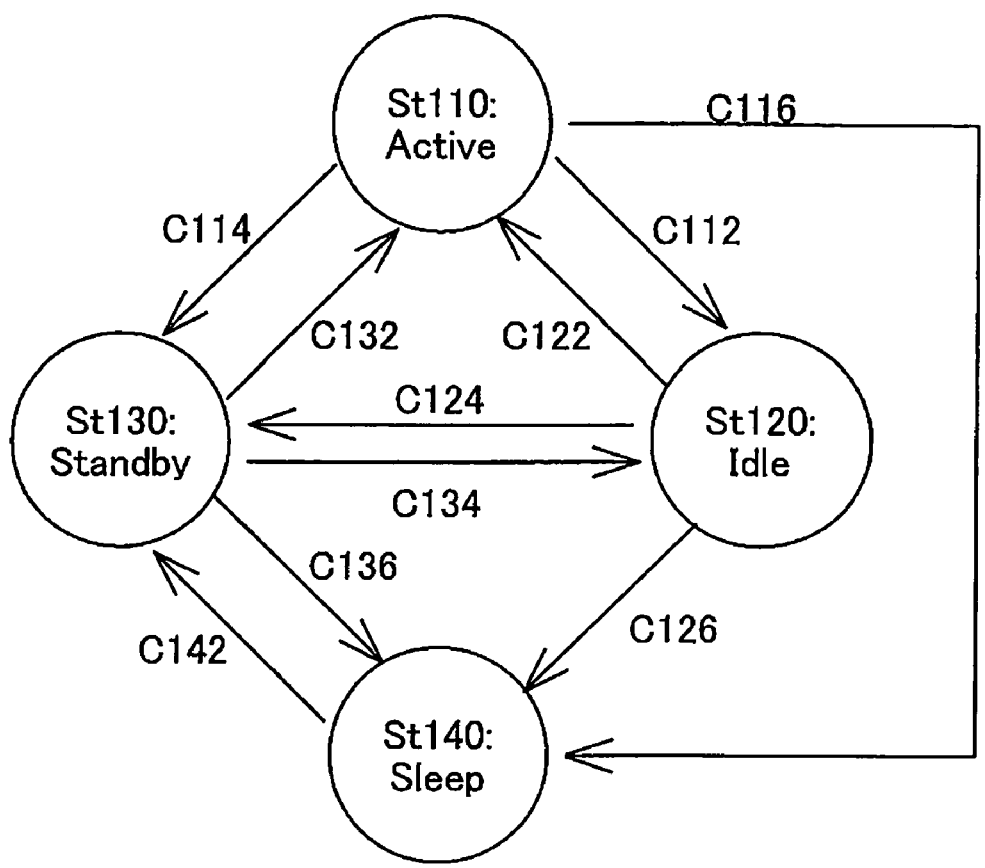
FIG. 2 is an illustration of transition between operating states (operating modes) related to the electrical control of the disk drive device 200.

FIG. 2 illustrates transition between operating states (operating modes) related to the electrical control of the disk drive device 200 in FIG. 1. For example, the four following operating states (operating modes) are defined in the ATA standards.
(1) Active mode (St110)
(2) Idle mode (St120)
(3). Standby mode (St130)
(4) Sleep mode (St140)

Active mode is the operating mode in which the data relay module 224 (FIG. 1) can respond to read commands or write commands immediately. In the active mode, the disk 262 and magnetic head 264 are in an operating state. The response time to read commands and write commands is shorter than any of the other modes described below. However, the disk drive device 200 consumes more electrical power than the other operating modes described below.

Idle mode is the operating mode in which the vendor-specific (manufacturer-specific) power control is carried out. In the idle mode, the mode control module 222 (FIG. 1), for example, retracts the magnetic head 264 to a desired retraction position or stops the supply of power to the part of the electrical circuitry. As a result, the electrical power consumption by the disk drive device 200 in the idle mode is lower than in the active mode. However, the response time to read and write commands is longer than in the active mode. This is because of the time it takes to switch from the idle mode to the active mode.

Standby mode is the operating mode in which even less power is consumed than in the idle mode. In the standby mode, the mode control module 222 (FIG. 1) stops the spindle motor (not shown), for example. However, the response time to read and write commands is even longer than in the active or the idle modes. This is because of the time it takes to switch from the standby mode to the active mode.

Sleep mode is the operating mode in which even less electrical power is consumed than in the standby mode. In the sleep mode, the mode control module 222 (FIG. 1) stops the supply of power to more of the electrical circuitry than in the other modes. As a result, the power consumption in the sleep mode is the lowest among the four modes. In the sleep mode, the data relay module 224 cannot respond to read and write commands. Instead, the mode control module 222 shifts the operating mode from the sleep mode to the standby mode in response to an external reset command (C142). A hardware reset or a DEVICE RESET command from the storage disk controller 110 can be used as a reset command, for example.

When the drive controller 210 (FIG. 1) receives a read or write command from the storage disk controller 110 while in the standby or the idle mode, the mode control module 222 shifts the operating mode to the active mode (C132, C122). After the operating mode has been shifted to the active mode, the data relay module 224 carries out the read or write process according to the command from the storage disk controller 110.

When the drive controller 210 (FIG. 1) receives a mode select request from the storage disk controller 110 while in the active mode, the mode control module 222 shifts the operating mode to the idle, the standby, or the sleep mode according to the request (C112, C114, C116). Examples of such requests include IDLE commands, IDLE IMMEDIATE commands, STANDBY commands, STANDBY IMMEDIATE commands, and SLEEP commands. The drive controller 210 switches modes according to mode select requests in the same manner in the other modes (C124, C134, C136, C126). The mode control module 222 may also automatically switch operating modes. For example, when the drive controller 210 has not received a read or write command for a certain period of time, the mode control module 222 may automatically switch the operating mode to the standby mode.

As described above, the order in which the plurality of operating modes of the disk drive device 200 are closer to a read/write operating state is: the active mode, the idle mode, the standby mode, and the sleep mode. The order in which the plurality of operating modes is closer to a read/write operation state is the same as the order in which the response time to read or write command is shorter. Normally, the further the operating mode is away from a read/write operation state, the higher the proportion of structural elements (electrical circuitry) to which the power supply has been stopped. The order of greater power consumption is therefore the same as the order in which an operating mode is closer to a read/write operation state.

Figure 3:
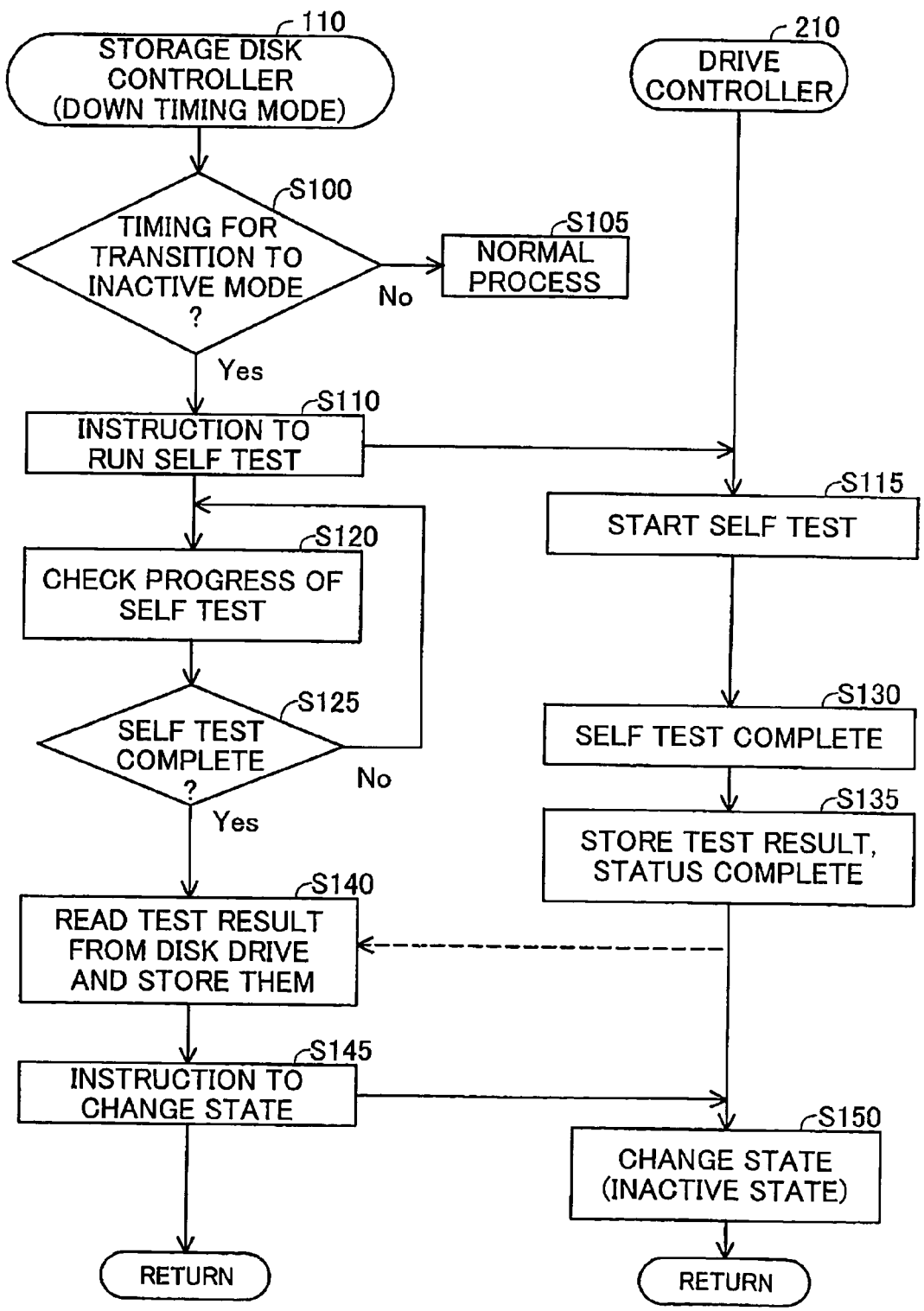
FIG. 3 is a flow chart of the procedure of timing control process for self-test in the first embodiment.

FIG. 3 is a flow chart of the procedure of timing control process for self-test in the first embodiment. In the example in FIG. 3, the instruction module 120 controls the timing for running a self test according to a down timing mode. The down timing mode is one of timing control process modes (referred to below as timing modes). In the down timing mode, a self test is run before the operating mode of the disk drive device 200 is switched from the active mode to one of the other modes. In the example in FIG. 3, it is assumed that the current operating mode of the disk drive device 200 is the active mode.

In the initial step S100, the operation information obtaining module 123 determines whether or not the timing is for the operating state (operating mode) of the disk drive device 200 to move from the active to a non-active mode (such as the idle or the standby mode). The determination is made responsive to any given triggers for switching the operating state.

In the first embodiment, as there is satisfied a predetermined condition that the storage disk controller 110 has not received a request for read/write to the disk drive device 200 for a certain period of time, the data relay module 122 sends a command (such as a standby command) to the drive controller 210 to switch the operating mode from the active to a non-active. The control by the data relay module 122 is done by using the timer (not shown) of the storage disk controller 110. The other disk drive devices 200a and 200b are also controlled in this manner. The power consumption of the storage system 300 can thus be reduced because the operating mode of infrequently accessed disk drive devices is switched to a non-active mode. The storage system 300 also produces less heat as a whole, allowing disk drive devices to be assembled in greater density so as to reduce the size of the storage system 300. Because the operating time (active mode time) per unit time (such as one week) can be shortened, the life of the disk drive devices can be extended. This type of storage system is referred to as MAID (Massive Array of Inactive Disks). Any disk drive device, not just infrequently accessed disk drive devices, can be used as disk drive devices in which operating modes can switch to a non-active mode. For example, the operating modes of certain pre-selected disk drive devices can be switched to a non-active mode when not accessed. Any structure, not just data relay modules 122, can be used as a down control module configured to run a process in which the operating modes of at least part of unaccessed (not in reading or writing) disk drive devices is switched in this way from an operating mode close to a reading/writing operation state to another operating mode further away (from the active mode to a non-active mode, for example). The structure of the storage system is not limited those having this type of down control module. Any structure can be employed as the storage system, in which the operating modes of at least part of unaccessed disk drive devices are switched from an operating mode close to a reading/writing operation state to another operating mode further away.

The operation information obtaining module 123 monitors the operation of the data relay module 122 to detect when the data relay module 122 is about to switch operating modes, and notifies the instruction module 120 about the detection. In response to the notification, before sending an operating mode select command, the instruction module 120 determines that the current point in time is the transition timing (S100: Yes).

It is also possible to use a structure in which the mode control module 222 (FIG. 1) automatically switches the operating modes from the active mode to a non-active mode. In that case, before the operating modes are switched, the mode control module 222 sends notification of the switch to the storage disk controller 110, and the operation information obtaining module 123 notifies the instruction module 120 about the switch upon receiving the notification. The instruction module 120 makes the determination in step S100 according to the notification. After the determination, the storage disk controller 110 and drive controller 210 proceed through the process according to the procedure in FIG. 3. Any trigger, not just triggers described above, can be employed as the trigger for switching the operating state. For example, commands from the user may be used.

When the current point in time is not the transition timing, in step S105 the storage disk controller 110 continues the ordinary process (such as reading/writing in response to read and write commands from the host computer 400).

When the current point in time is the transition timing, in the next step S110 the instruction module 120 sends instructions to the disk drive device 200 to run a self test. The self test module 220 then starts the self test in response to the instructions (step S115). The self test is a process for diagnosing the function of the disk drive device 200 itself. Various processes can be used as the self test process. For example, a process for testing data reading/writing or a process for testing the drive of the magnetic head 264 or spindle motor (not shown) can be used. Also, the self test often is done in the same operating mode (the active mode in the example in FIG. 2) as when a read or write process is being done. The details of the self test can generally be determined by vendors (manufacturers) themselves. Various methods can also be used as the method for the instructions to the drive controller 210 to run the self test. For example, the method for transmitting a SMART EXECUTE OFF-LINE IMMEDIATE command defined by the ATA may be used.

The result obtaining module 121 repeatedly checks the progress of the self test (step S120), and waits for the self test to be completed (step S125). The result obtaining module 121 can transmit a Read Data command defined by the ATA, for example, to the drive controller 210 to ascertain the progress from the drive controller 210 (self test module 220). Other methods can also be used to obtain the status of the progress.

The self test module 220 stores the test results in the memory 218 of the drive controller 210 in the next step S135 when the self test is completed (step S130), and switches the progress status transmitted to the result obtaining module 121 from "in progress" to "completed."

When the result obtaining module 121 obtains the progress status indicating "completed" (step S125: Yes), the result obtaining module 121 obtains the test results from the drive controller 210 in the next step S140, and stores the obtained test results in memory 114. The test results are obtained in the same way in which the progress status is obtained.

Here, when normal self test results are not returned (for example, when test results of a malfunction are returned or when no test results are returned), the result obtaining module 121 preferably sends a notification of an abnormality. Any target device and any method can be used for such notifications. For example, the data relay module 122 may be notified of the abnormality. The host computer 400 may also be notified of the abnormality. Error messages may also be displayed on a management terminal monitor (not shown) connected to the storage system 300, or a warning sound may be emitted from a management terminal speaker (not shown). The same is true of the other embodiments below.

In the next step S145, the data relay module 122 sends an instruction to shift the operating state (mode select request) to the drive controller 210. Standby commands or idle commands can be used as such requests, for example. In the next step S150, the mode control module 222 shifts the operating mode according to the mode select request received.

Any method can be used as the method by which the self test module 220 runs a self test before the operating mode is changed. For example, the data relay module 122 may send a mode select request responsive to completion of the self test.

Subsequently, in response to the change in the operating mode of the disk drive device 200, the storage disk controller 110 and drive controller 210 complete the timing control process. The timing control process in FIG. 3 is also carried out every time the operating mode shifts from the active to a non-active.

Figure 4:
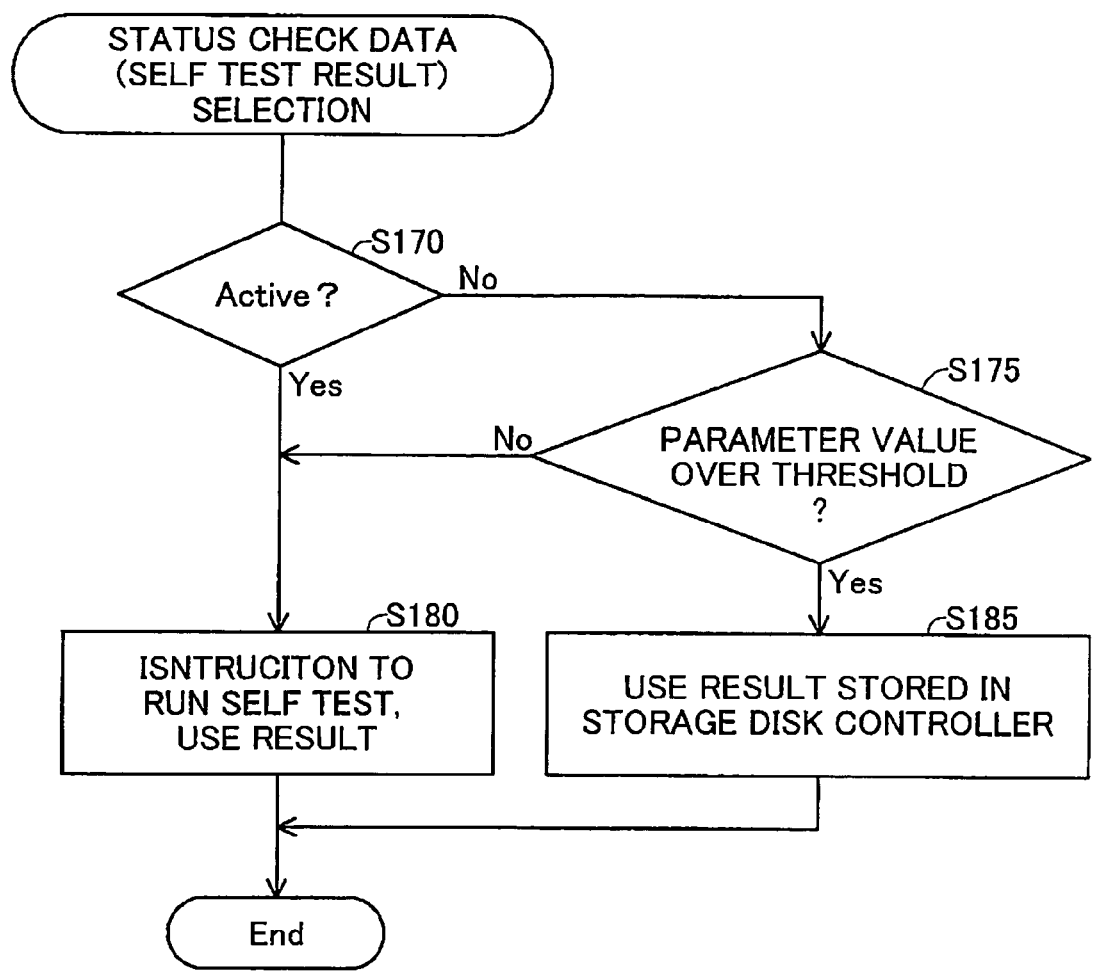
FIG. 4 is a flow chart of the procedure in a process for selecting self test data (self test result)

FIG. 4 is a flow chart of the procedure for selecting self test data (self test results). The result obtaining module 121 selects the self test results that should be provided according to the procedure in FIG. 4 in response to requests to reference the self test results. The options are the self test results based on a new self test and the self test results already stored in memory 114. The result obtaining module 121 makes the selection according to the current operating mode of the disk drive device and the parameter values showing the operating history of the disk drive device.

Any request can be used as the request to reference the self test results. For example, the storage disk controller 110 can run a process in which the self test results are used to detect disk drive devices that have a high possibility of resulting in malfunctions. The result obtaining module 121 may provide the self test results to the user in response to user requests. For example, the result obtaining module 121 may receive user instructions from a management terminal (not shown) connected to the storage controller 100 and display the self test results on the management terminal monitor (not shown).

FIG. 5 illustrates an example of a threshold management table 126. In the example in FIG. 5, examples of parameters include the total number of times and frequency of "spin-up," "spin-down," "power-on," "power-off," and "read/write R/W)." Continuous operating times may also be used as parameters. These parameters all reflect the operating history of the disk drive device 200. The threshold management table 126 stores the current parameter values and thresholds.

"Spin-up" means a process in which the operating state of the disk drive device 200 moves to a state closer to the reading/writing state. Examples of spin-up include a process in which the rotating speed of the disk 262 (spindle motor) is increased to the designated rotating speed for reading/writing, or a process in which the magnetic head 264 which has been retracted to the retraction position is placed on the disk 262. In the first embodiment, moving the operating mode from a non-active mode to the active mode is handled as spin-up. For example, the number of spin-up times increases by '1" when power is supplied to the disk drive device 200 and when the operating mode moves from a non-active mode to the active mode.

"Spin-down" means the opposite of spin-up. Examples of spin-down are processes in which the disk 262 (spindle motor) is stopped and processes in which the magnetic head 264 placed on the disk 262 is retracted to the retraction position. In the first embodiment, moving the operating mode from the active mode to a non-active mode is handled as spin-down.

"Power-on" means a process in which power for the disk drive device 200 is turned ON. In the first embodiment, the number of power-on times increases by "1" when power is supplied to the disk drive device 2000 and when the operating mode of the disk drive device 200 moves from the sleep mode to the non-sleep mode (such as standby or active).

"Power-off" is the opposite of power-on. In the first embodiment, the number of power-off times increases by "1" when power supplied to the disk drive device 2000 is turned OFF and when the operating mode of the disk drive device 200 moves from the non-sleep mode (such as active or idle) to the sleep mode.

"R/W" means the processes for reading and writing to the disk drive device 200.

In the threshold management table 126 in FIG. 5, the number of processes within a certain time up to the current point in time is used as the "frequency." For example, the number of times that the disk drive device 200 is spun up within the most recent certain time interval is used as the "spin-up frequency." Various times can be used as the certain time interval, such as several hours to several days. Any parameter related to frequency can be used as a frequency parameter. The elapsed time since the last process was run may be used as the frequency parameter, for example.

The "continuous operating time" means the elapsed times from the start of power-on to the disk drive device 200 until the current point in time. The units are "minutes."

The parameter thresholds noted above are pre-established. The current values of the above parameters may be updated as desired by the operation information obtaining module 123 that monitors the operation of the storage disk controller 110.

The continuous operating time, the frequency and number of times of a process determined for each parameter are used as the parameters for the threshold management table 126. It can thus be inferred that the greater the parameter value, the greater the possibility that a malfunction will occur in the disk drive device 200 in the near future. In other words, it can be assumed that the greater the parameter values, the shorter the life of the disk drive device 200. In the selection process of FIG. 4, the result obtaining module 121 thus provides a requester with the self test results, and determines whether or not to run a self test, according to the magnitude of the parameter values.

In the initial step S170 in FIG. 4, the result obtaining module 121 determines whether or not the operating mode of the disk drive device 200 is in the active mode. The result obtaining module 121 obtains the current operating state from the drive controller 210 through the operation information obtaining module 123.

When the operating mode is in the active mode, the result obtaining module 121 determines that the current point in time is the time that instructions should be given to run the self test. In the next step S180, the result obtaining module 121 transmits the instruction to run the self test to the drive controller 210, and obtains the self test results from the drive controller 210. The process in step S180 is the same as the processes in steps S110 through S140 in FIG. 3. The result obtaining module 121 uses the obtained self test results and completes the selection process.

When the operating mode is in the active mode, the self test module 220 can run a self test without switching the operating mode. The result obtaining module 121 can thus obtain new self test results while preventing the life of the disk drive device 200 from being shortened caused by switching the operating mode.

Meanwhile, when the operating mode is not in the active mode, the result obtaining module 121 moves to step S175, and uses the threshold management table 126 as reference to determine if at least one parameter is over the threshold. When at least one parameter is over the threshold, the result obtaining module 121 moves to step S185 and uses the existing self test results stored in memory 114 without having the disk drive device 200 run a new self test.

The existing self test results stored in memory 114 are used for the following reasons when at least one parameter is over the threshold. When the self test module 220 runs a self test in cases where the operating mode of the disk drive device 200 is in a non-active mode, it is possible that the operating mode of the disk drive device 200 will change from a non-active mode to the active mode as the self test is run. Such a change in the operating mode will impose a particularly high load on the disk drive device 200, with a high possibility of shortening the life of the disk drive device 200. In that case, when a parameter is over the threshold (FIG. 4; S175: Yes), the result obtaining module 121 uses the existing self test results stored in memory 114 without having the disk drive device 200 run a new self test. As a result, the life of the disk drive device 200 can be prevented from being shorted by the change in operating modes as a self test is run. In this case, the self test results can be given rapidly without waiting for the self test to finish.

The existing stored results are the results of a self test running immediately before the operating mode switches to a non-active mode (FIG. 3). In this case, because the operating mode is not switched to the active mode after the self test is run, it can be assumed that the extent of the difference in the deterioration of the disk drive device 200 between when the previous self test is run and the present point in time is low enough. That is, the existing stored self test results can be used instead of new self test results while preventing any loss of reliability of the self test results when using the self test results.

Meanwhile, when no parameters are over the threshold (FIG. 4: S175: No), the result obtaining module 121 determined that the current point in time is the time that instructions for the self test should be given, and moves to step S180. In step S180, the result obtaining module 121 instructs the self test module 220 to run the self test and uses the resulting self test results. The mode control module 222 switches the operating mode to the active mode for the self test. In this case, it can be assumed that the disk drive device 200 has a long remaining life, and it will thus be better to obtain the most recent self test results by running the self test.

As described above, in the down timing mode (FIG. 3), the instruction module 120 has the self test module 220 run the self test before the operating mode is switched, responsive to the trigger for switching the operating mode of the disk drive device 200 from the active mode to a non-active mode, that is, the trigger for spin-down. The self test results can be used to reflect the state of the disk drive device 200 at the present point in time, while the operating mode then switches from a non-active mode to the active mode, that is, until the next spin-up. Thus the control in the down timing mode (FIG. 3) can achieve a balance between reliability of the self check results when making use of the self check results, and preventing the shortening of disk drive device life caused by such self checks.

In the first embodiment, as illustrated in FIG. 4, the result obtaining module 121 determines whether to execute the self test based on the parameters and the operating mode of the disk drive device 200, responsive to test result reference requests. Thus the control shown in FIG. 4 can achieve a balance between reliability of the self check results when making use of the self check results, and preventing the shortening of disk drive device life caused by such self checks. Any condition indicating a relatively low possibility of malfunctions in the near future can be used as conditions for determining to run a self test in step S175. For example, it is possible to use only some of the parameters in FIG. 5 as the condition parameters.

B: Second Embodiment

Figure 6:
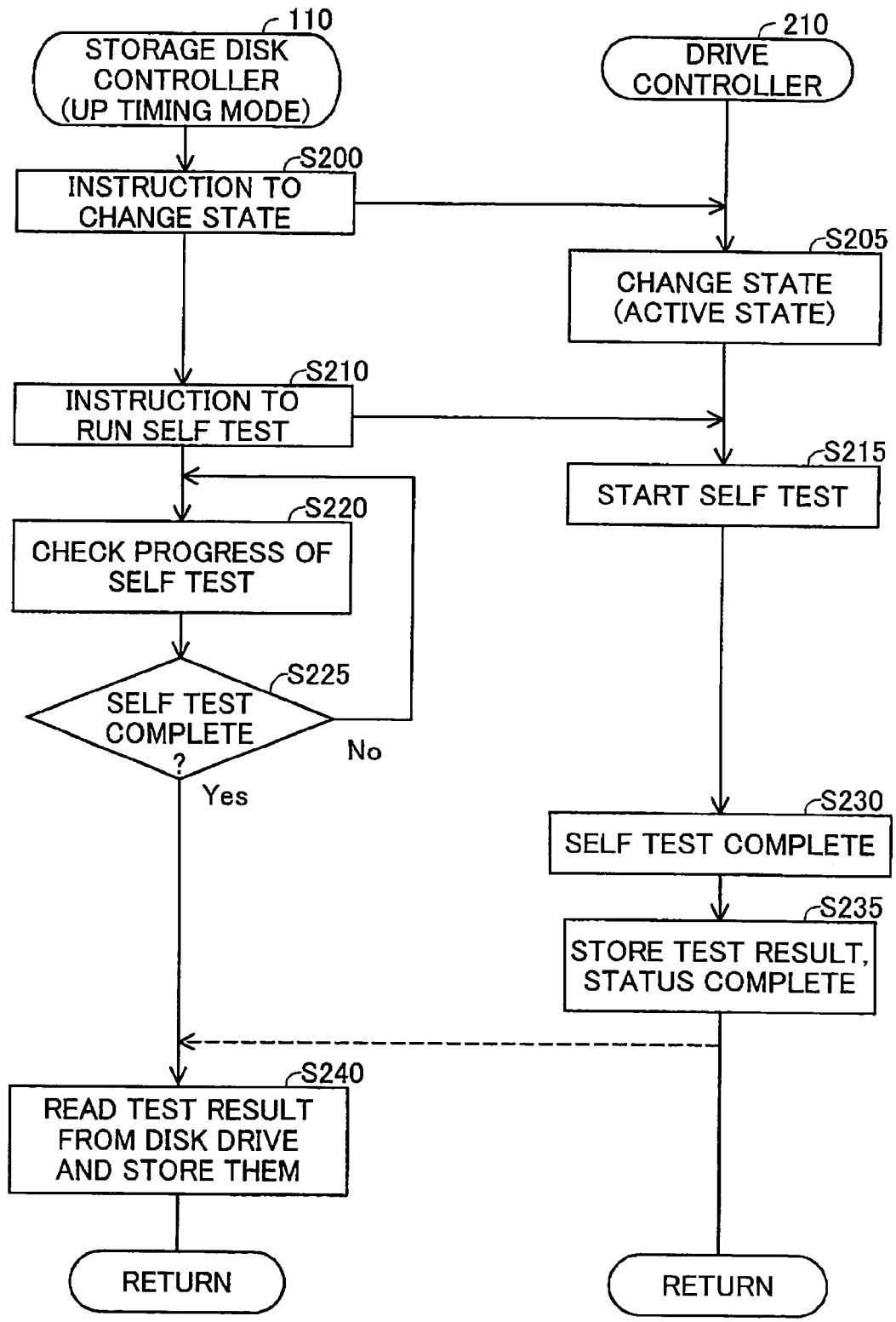
FIG. 6 is a flow chart of the procedure in a timing control process in the second embodiment.

FIG. 6 is a flow chart of a procedure for a timing control process in the second embodiment. The difference from the first embodiment in FIG. 3 is that the instruction module 120 executes a timing control process according to an up timing mode instead of the down timing mode. In the up timing mode, a self test is run responsive to switching the operating mode of the disk drive device 200 from a non-active mode to the active mode. The structure of the data processing system is the same as that of the data processing system in FIG. 1.

In the initial step S200, the data relay module 122 (FIG. 1) transmits an instruction to change the operating mode from a non-active mode to the active mode (mode select request) to the drive controller 210. In the second embodiment, the data relay module 122 transmits a command to the drive controller 210 to switch the operating mode from a non-active mode to the active mode when the storage disk controller 110 receives a read or write command for the disk drive device 200 while the operating mode of the disk drive device 200 is in a non-active mode.

Any given triggers can be used for switching the operating mode. For example, user instruction can be used as the trigger.

In the next step S205, the mode control module 222 shifts the operating mode in response the received mode select request.

The operation information obtaining module 123 monitors the operation of the storage disk controller 110 (data relay module 122) to detect when the data relay module 122 has sent a mode select request, and notifies the instruction module 120 about the detection. In response to the notification, the instruction module 120 transmits an instruction to run a self test to the drive controller 210, and the result obtaining module 121 obtains the self test results from the drive controller 210 (S210 to S240). The processes in steps S210 to S240 are the same as those in steps S110 to S140 in FIG. 3. The timing control process is completed when the result obtaining module 121 stores the self test results in memory 114. The timing control process illustrated in FIG. 6 is run every time the operating mode moves from a non-active mode to the active mode.

The self test is preferably run before at least one of the read process and the write process is run after the operating mode changes to the active mode. This will prevent at least one of the read process and the write process from being executed while the disk drive device 200 is malfunctioning. Any method can be used to run the self test by this type of timing. For example, the data relay module 122 may run each of the read and write process responsive to completion of the self test.

The result obtaining module 121 selects the self test results that should be given according to the procedure in FIG. 4 in response to a request to reference self test results in the same manner as in the first embodiment. Here, in step S185, the existing self test results stored in memory 114 are used. The existing self test results that have been stored are the results of a self test that has been run when the operating mode is switched from a non-active mode to the active mode last time. Here, because the operating mode is not switched to the active mode after the previous self test has been run, it may be assumed that the difference in the state of the disk drive device 200 between when the self test is run and the present point in time is low enough. The existing stored self test results can thus be used as being representative of the status of the disk drive device 200 at the present point in time while preventing any loss of reliability of the self test results when using the self test results.

As noted above, in the up timing mode (FIG. 6), the instruction module 120 transmits an instruction to run a self test to the self test module 120 after the operating mode has switched, responsive to the trigger for switching of the operating mode of the disk drive device 200 from a non-active mode to the active mode, that is, the trigger for spin-up. The result obtaining module 121 can thus use the appropriate self test results without having the drive controller 210 run a self test in step S185 in FIG. 4. Thus the control in the up timing mode shown in FIG. 6 can achieve a balance between reliability of the self check results when making use of the self check results, and preventing the shortening of disk drive device life caused by such self checks.

C: Third Embodiment

Figure 7:
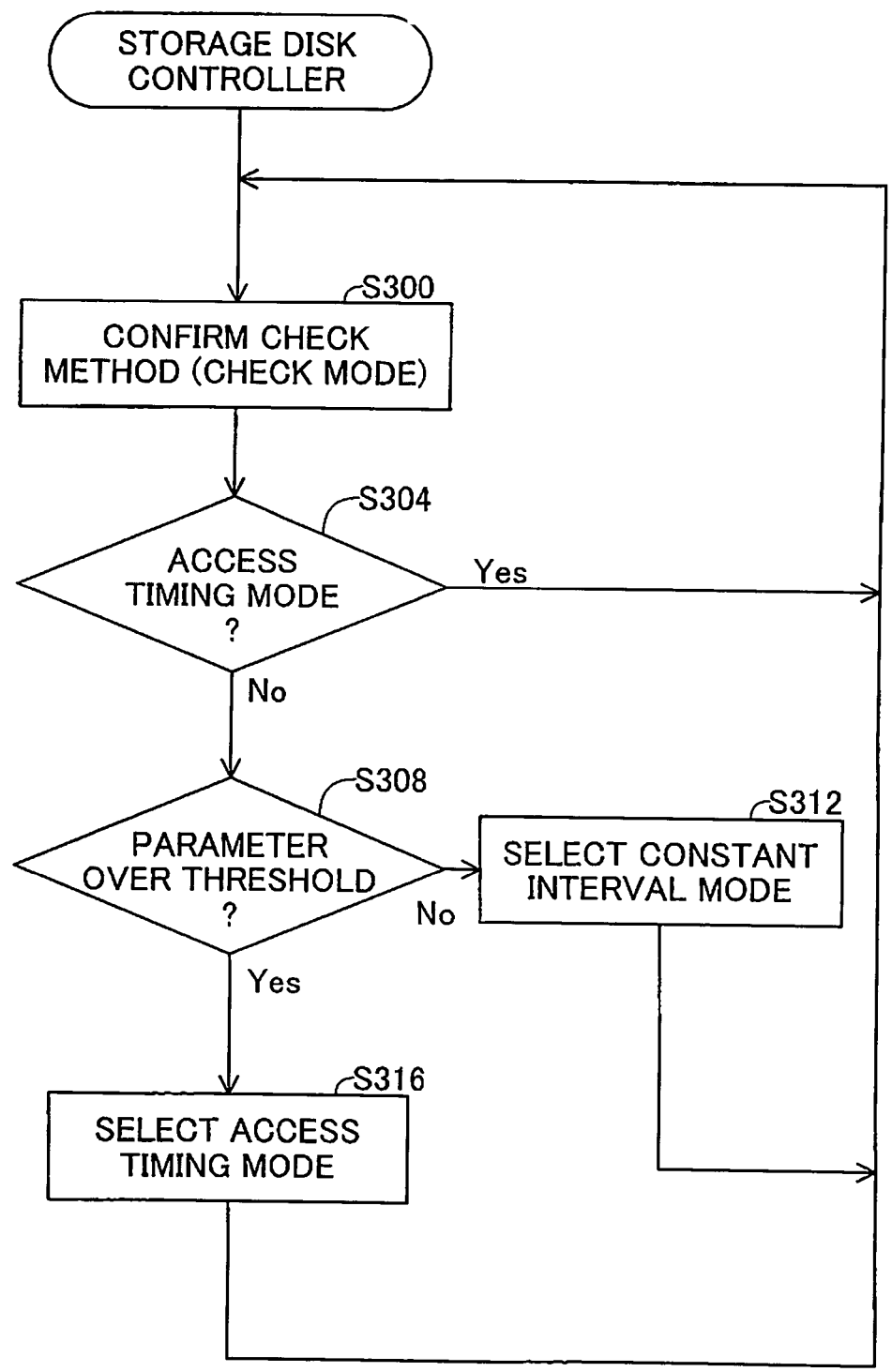
FIG. 7 is a flow chart of the procedure for selecting the timing mode in a third embodiment

FIG. 7 is a flow chart of a procedure for selecting the timing mode in a third embodiment. The difference from the first and the second embodiments is that the instruction module 120 has two modes, a constant interval mode and an access timing mode, as timing modes. The structure of the data processing system is the same as that of the data processing system in FIG. 1.

In the constant interval mode, the instruction module 120 has the drive controller 210 run a self test at constant intervals. In the access timing mode, the instruction module 120 determines whether to run the self test according to the state of access to the disk drive device. Between these two timing modes, the self test is run at timing (check timing) that is different from each other. Details on the modes are given below. It is assumed that the disk drive device 200 is the target in the following description. The details of the process are the same when targeting the other disk drive devices 200a and 200b, however.

The instruction module 120 selects a timing mode according to the procedure in FIG. 7. The selection process is carried out regardless of whether or not there are any requests to reference the self test results. Any timing can be used to carry out the selection process. For example, the instruction module 120 may carry out the selection process at constant intervals. User instructions may also be used as the trigger. In the third embodiment, the instruction module 120 makes use of the constant interval mode as the initial mode of the timing mode. However, other modes may be used as the initial mode.

In the initial steps S300 and S304, the instruction module 120 checks the current timing mode and determines whether or not it is the access timing mode. When the current timing mode is the access timing mode, the instruction module 120 finishes the selection process.

When the current timing mode is not the access timing mode, that is, when it is the constant interval mode, in the next step S308 the instruction module 120 uses the threshold management table 126 (FIG. 5) as reference to determine whether any parameters are over the threshold.

When no parameters are over the threshold, the instruction module 120 moves to step S312, selects (maintains) the constant interval mode, and finishes the selection process.

When at least one parameter is over the threshold, the instruction module 120 moves to step S316, selects the access timing mode, and finishes the selection process.

The instruction module 120 runs the aforementioned selection process every time the instruction module 120 receives the trigger for selection of the timing mode.

Figures 8, 9:
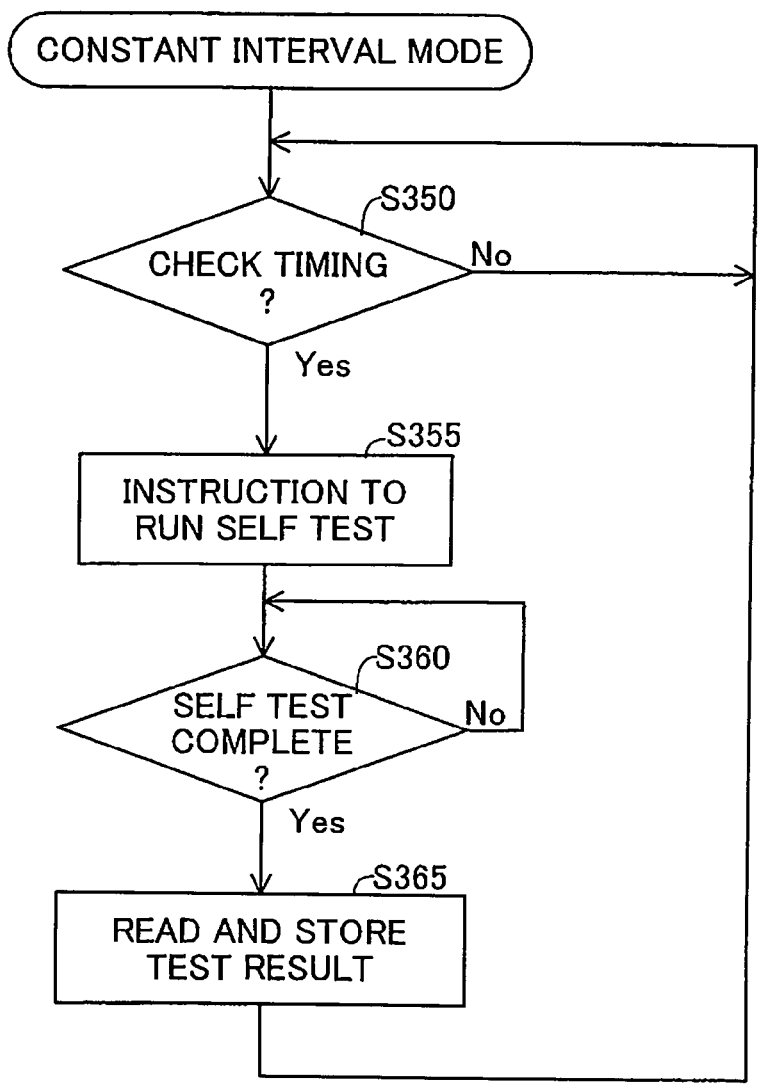
FIG. 8 is a flow chart of the procedure in a timing control process in the constant interval mode.
FIG. 9 is an illustration of an example of the check interval configuration table 128.

FIG. 8 is a flow chart of the procedure in the timing control process in the constant interval mode. The timing control process is carried out regardless of whether or not there are any requests to reference the self test results. In the first step S350, the instruction module 120 references the check interval configuration table 128 (FIG. 1) to determine if the current point in time is timing for running a self test. FIG. 9 illustrates an example of the check interval configuration table 128. The threshold means a time interval for checking the state of the disk drive device (self test). In the example in FIG. 9, the threshold is preset to 1440 minutes (24 hours). However, it may be set to a different value. The current value is the time since the last self test was run until the current point in time. The current value (current value of check interval) is referred to as the "check elapsed time." The instruction module 120 makes use of the timer (not shown) in the storage disk controller 110 to update the check elapsed time.

When the check elapsed time is at or under the threshold, the instruction module 120 determines that this is not timing to run a self test, and the instruction module 120 waits until the check elapsed time becomes over the threshold.

When the check elapsed time becomes over the threshold, the instruction module 120 sends an instruction to run a self test to the drive controller 210, and the result obtaining module 121 obtains the self test results from the drive controller 210 (S355 to S365). The processes in these steps S355, S360, and S365 are the same as the processes in steps S110, S120 to S125, and S140 in FIG. 3 respectively (the process in step S360 is the same as the process in steps S120 and S125). In the constant interval mode, the self test is run regardless of the current operating mode of the disk drive device 200.

The instruction module 120 resets the check elapsed time to zero and waits for the next timing to run the test when the self test results are read out and stored in memory 114. The timing for resetting the check elapsed time can be any timing determined according to the executing of the self test. For example, the check elapsed time may be reset in step S355 in FIG. 8. The same is true of the other embodiments below.

Figure 10:
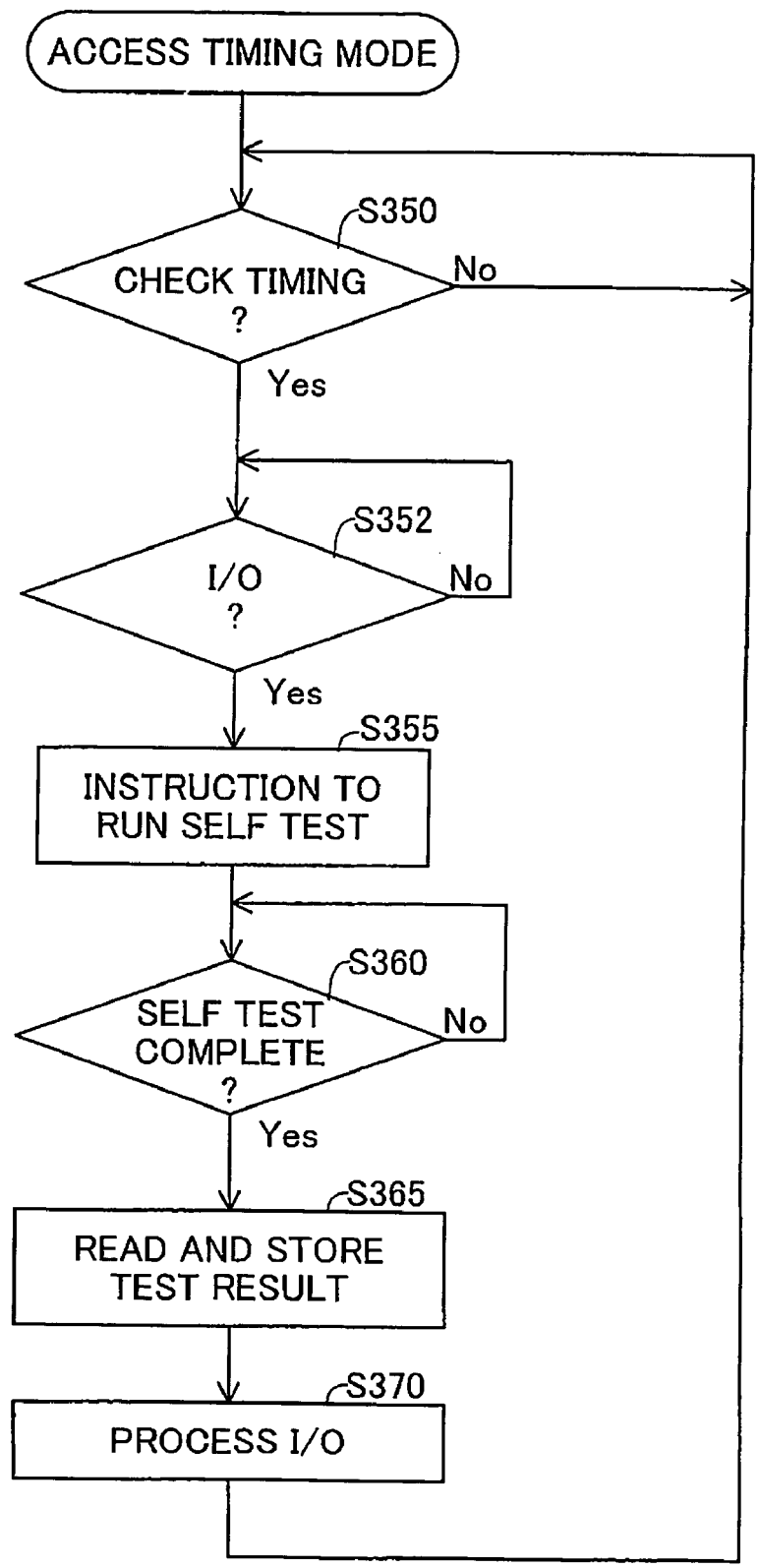
FIG. 10 is a flow chart of the procedure in a timing control process in access timing mode.

FIG. 10 is a flow chart of the procedure for the timing control process in the access timing mode. The difference from the constant interval mode in FIG. 8 is that when the check elapsed time becomes over the threshold, the instruction module 120 furthermore waits for at least one of the read command and the write command to the disk drive device 200 to have the drive controller 210 run the self test. Specifically, a step for waiting for at least one of the read command and the write command is provided between step S350 and step S355. After step S365, a step S370 is provided to carry out a reading or writing process in response to read or write command. The processes in the other steps S350, S355, S360, and S365 are the same as those in the example in FIG. 8.

When the check elapsed time becomes over the threshold (step S350: Yes), the instruction module 120 moves to step S352. In step S352, the operation information obtaining module 123 monitors the operation of the data relay module 122 to detect when the data relay module 122 (storage disk controller 110) receives a read or write command, and notifies the instruction module 120 about the detection. In response to the notification, the instruction module 120 determines that the current point in time is the timing that instructions should be given to run a self test, then moves to step S355 and transmits an instruction to run a self test to the drive controller 210. The result obtaining module 121 obtains the self test results from the drive controller 210 and stores them in memory 114 (S360 and S365). The processes in these steps S355, S360, and S365 are carried out before the data relay module 122 carries out the read or write process in response to read or write command from the host computer 400.

When the self test is completed, in the next step S370 the data relay module 122 transmits a read command or write command to the disk drive device 200. The transmitted command is in response to a request from the host computer 400.

The self test results are stored in memory 114 in the manner described above. The self test results are used according to the same procedure as in FIG. 4.

In the access timing mode, the instruction module 120 has the self test module 220 run the self test while synchronized with at least one of read and write request to the disk drive device 200. Thus, in the access timing mode, the operating mode of the disk drive device 200 is prevented from switching from a non-active mode to the active mode for just the execution of a self test. The life of the disk drive device can thus be prevented from being shortened result from running a self test.

In the third embodiment, the instruction module 120 switches the timing for running the self test based on parameters showing the operating history of the disk drive device 200 (FIG. 7). Specifically, the instruction module 120 determines the possibility of malfunctions occurring in the disk drive device 200 in the near future. When the instruction module 120 determines that the possibility is relatively high, the access timing mode is selected, and when the possibility is determined to be relatively low, the constant interval mode is selected. Thus the control method shown in the third embodiment can achieve a balance between reliability of the self check results when making use of the self check results, and preventing the shortening of disk drive device life caused by such self checks.

Any condition showing a relatively high possibility of a malfunction occurring in the near future can be used as the condition for selecting the access timing mode in step S308 in FIG. 7. For example, it is possible to use only part of the parameters in FIG. 5 as the parameter.

Any timing mode, not just a constant interval mode, can be used as the timing mode serving as an alternative to the access timing mode. However, the mode preferably gives an instruction to run a self test regardless of the operating state or operating history of the disk drive device 200. This can improve the reliability of the self test results when using the self test results. For example, a mode giving an instruction to run the self test according to a certain schedule may be used. However, the use of a constant interval mode can effectively improve the reliability of the test results when using the test results because the test results are periodically updated.

D: Fourth Embodiment

Figure 11:
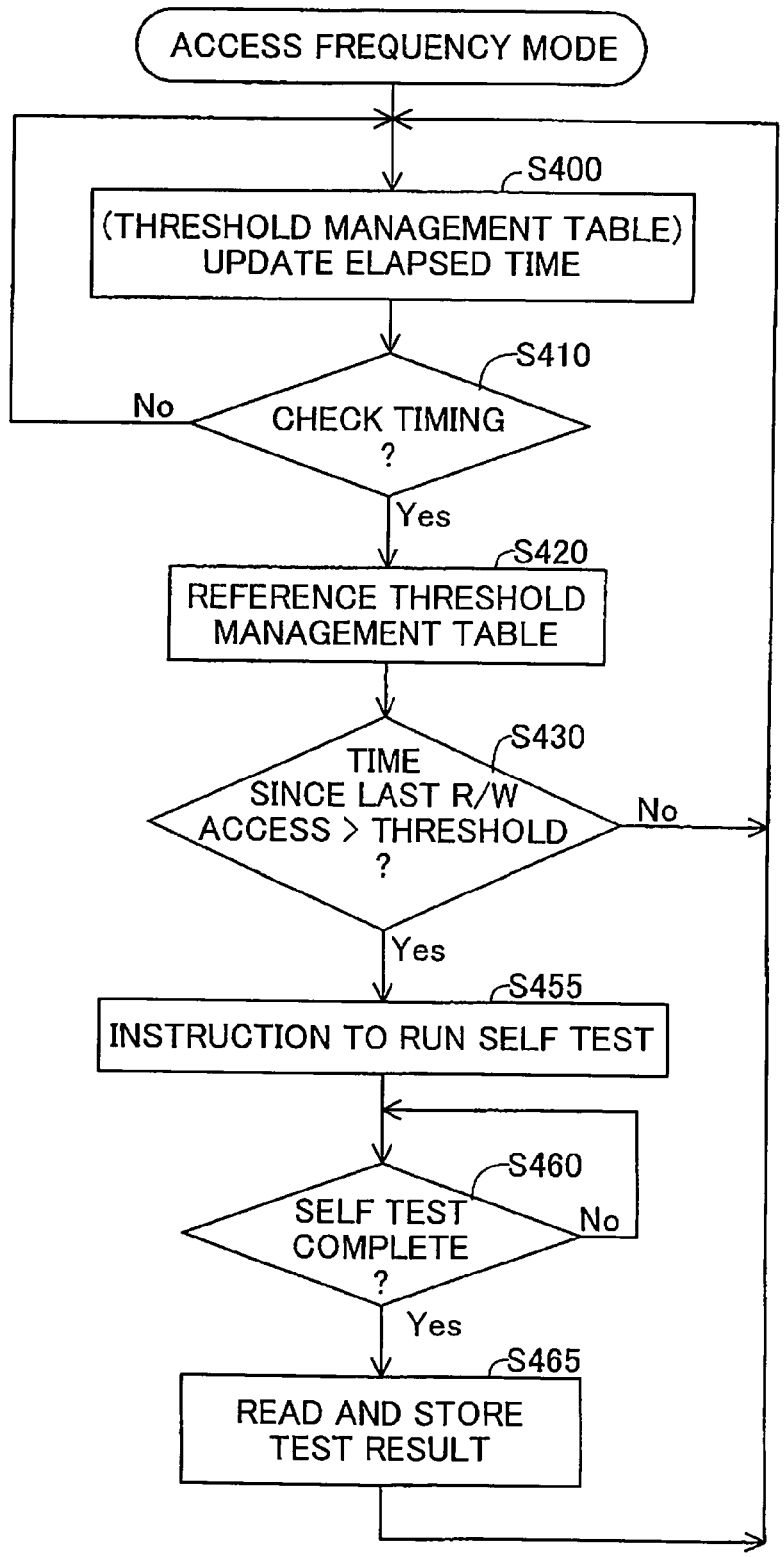
FIG. 11 is a flow chart of the procedure in another example of a timing control process.

FIG. 11 is a flow chart of a procedure in another example of a timing control process. The difference from the constant interval mode in FIG. 8 is that, in an access frequency mode, when the check elapsed time becomes over the threshold, the instruction module 120 furthermore determines whether or not to run a self test according to the access frequency at the current point in time to the disk drive device. The timing control process is also carried out regardless of whether or not there are requests to reference the self test results. It is assumed that the disk drive device 200 is the target in the following description. However, the details of the process are the same when targeting the other disk drive devices 200*a* and 200*b*.

In the initial step S400, the operation information obtaining module 123 monitors the operation of the data relay module 122 to update the current value of the "R/W frequency" of the threshold management table 126. In the fourth embodiment, the time since the last read or write process was carried out on the disk drive device 200 is used as the "R/W frequency." The current value of the R/W frequency is referred to as the "access elapsed time."

In the next step S410, the instruction module 210 references the check interval configuration table 128 (FIG. 9) to determine whether or not the check elapsed time is at or under the threshold. The process in step S410 is the same as the process in step S350 in FIG. 8.

When the check elapsed time is not greater than the threshold (S410: No), the instruction module 120 determines that it is not timing to run the test, and waits until the check elapsed time becomes over the threshold. In the meantime, the operation information obtaining module 123 appropriately updates the access elapsed time (current "R/W frequency" value).

When the check elapsed time is over the threshold (S410: Yes), the instruction module 120 references the threshold management table 126 (FIG. 5) in step S420, and determines whether or not the access elapsed time is over the threshold in step S430. Here, when the access elapsed time is over the threshold, it means that the access frequency is less than the frequency represented by the threshold.

When the access elapsed time is not over the threshold, the instruction module 120 resets the check elapsed time to zero and waits for the next timing to run the test without having the disk drive device 200 run a new self test.

When the access elapsed time is over the threshold, the instruction module 120 determines that the current point in time is timing when an instruction should be given to run a self test and transmits an instruction to run a self test to the drive controller 210. The result obtaining module 121 obtains the self test results from the drive controller 210 (S455 to S465). These processes in these step sS455, S460, and S465 are the same as the processed in steps S355, S360, and S365 in FIG. 8. The instruction module 120 resets the check elapsed time to zero, and waits for the next timing, after completion of reading the test results and storing them in memory 114.

The self test results are thus stored in memory 114. The self test results are used according to the same procedure as in FIG. 4.

In the access frequency mode, the instruction module 120 doesn't have the disk drive device 200 run a self test when the access elapsed time at the current point in time is not greater than the threshold, that is, when the access frequency at the current point in time is higher than the frequency represented by the threshold. The reasons are given below. When the current access frequency is high, it means that the disk drive device 200 is operating normally in response to frequent read or write request. It can thus be assumed that changes until the present time in the possibility of malfunctions occurring in the disk drive device in the near future are sufficiently low. In other words, it can be assumed that the extent of the difference in the deterioration of the disk drive device 200 between when the stored self test results were obtained and the present point in time is low enough. In the access frequency mode, when the current access frequency is relatively high, no self test is run, and the stored self test results are then used. In this case as well, a loss of reliability of the self test results when using the self test results can be prevented as noted above. The life of the disk drive device 200 can also be prevented from being shortened result from running self test.

Various embodiments of processes can be used according to the access frequency mode. The instruction module 120, for example, may continue the process according to the access frequency mode. Alternatively, the access frequency mode may be used instead of the access timing mode in the procedure in FIG. 7.

E: Fifth Embodiment

Figure 12:
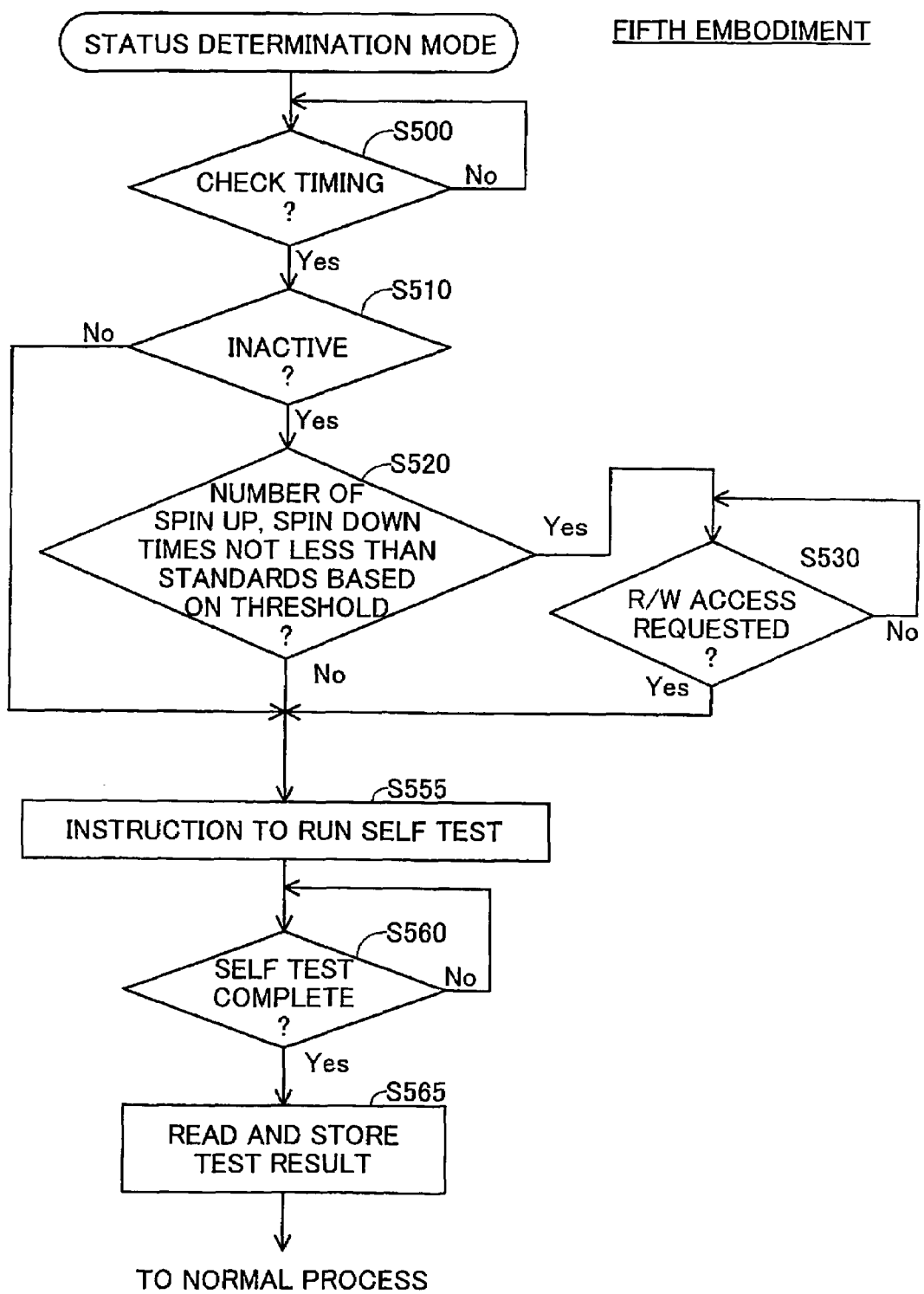
FIG. 12 is a flow chart of the procedure in another example of a timing control process.

FIG. 12 is a flow chart of a procedure for another example of a timing control process. The difference from the constant interval mode in FIG. 8 is that, in a status-determination mode, when the check elapsed time becomes over the threshold, the instruction module 120 switches the timing for running the self test according to the operating state of the disk drive device and the number of spin-up and spin-down times. This timing control process is carried out regardless of whether there are requests to reference the self test results. It is assumed that the disk drive device 200 is the target in the following description. However, the details of the process are the same when targeting the other disk drive devices 200*a* and 200*b*.

In the initial step S500, the instruction module 120 references the check interval configuration table 128 (FIG. 9) to determine whether the check elapsed time is at or under the threshold. The process in step S500 is the same as the process in step S350 in FIG. 8.

In the next step S510, the instruction module 120 determines if the operating mode of the disk drive device 200 is a non-active mode through the operation information obtaining module 123.

When the operating mode is the active mode, the instruction module 120 determines that the present time is timing when an instruction should be given to run a self test, and sends an instruction to run the self test to the drive controller 210 (S555). The result obtaining module 121 obtains the self test results from the drive controller 210 (S560 to S565). The processes in these steps S555, S560, and S565 are the same as the processes in steps S355, S360, and S365 in FIG. 8 respectively. The instruction module 120 resets the check elapsed time to zero and waits for the next timing to run the test after completion of reading the self test results and storing them in memory 114.

When the operating mode is a non-active mode (not the active mode), the instruction module 120 moves to step S520. In step S520, the instruction module 120 determines the possibility of malfunctions occurring in the disk drive device 200 in the near future in the same manner as in S175 in FIG. 4 or S308 in FIG. 7. Specifically, the instruction module 120 determines whether the "number of spin-up times" and the "number of spin-down times" are not greater than standard levels based on the thresholds. Here, various values lower than the threshold can be used as the standards. For example, values that are lower by a certain value (such as "1") than the threshold can be used. The reasons for using standards with values lower than the threshold are discussed below.

When both the "number of spin-up times" and the "number of spin-down times" are lower than the determination standards, the instruction module 120 determines that the present point in time is timing when an instruction should be given to run a self test. The instruction module 120 and the result obtaining module 121 run the processes in steps S555, S560, and S565 to store the self test results of the new self test in memory 114.

When at least one of the "number of spin-up times" and the "number of spin-down times" is not less the threshold, the instruction module 120 moves to step S530. The process in this step S530 is the same as the process in step S352 in FIG. 10. The instruction module 120 determines that the present point in time is timing when an instruction to run a self test should be given, responsive to receiving a read or write command by the storage disk controller 110. The instruction module 120 moves to step S555 and sends an instruction to run a self test to the drive controller 210. The result obtaining module 121 obtains the self test results from the drive controller 210 and stores them in memory 114 (S560, S565). These processes in these steps S555, S560, and S565 are carried out before the data relay module 122 carries out a read or write process according to read or write command from the host computer 400 in the same manner as in the example in FIG. 10. In this case, the data relay module 122 carries out the read or write process when the self test is completed (not shown). Any timing after the completion of the self test can be used as the timing in which the read or write process is carried out by the data relay module 122. For example, the timing may be between steps S560 and S565, or after step S565.

The self test results are stored in memory 114 in the manner above. The self test results are used according to the same procedure as in FIG. 4.

Thus, in the status-determination mode, the instruction module 120 switches the timing for running the self test based on both the current operating mode of the disk drive device 200 and parameters representing the operating history of the disk drive device 200. Specifically, when the operating mode is the active mode, the self test is run at a timing determined by the check elapsed time. In that case, new self test results are obtained while preventing the life of the disk drive device 200 from being shortened result from switching operating modes in the same manner as in steps S170 and S180 in FIG. 4.

When the current operating mode is a non-active mode, and both the "number of spin-up times" and the "number of spin-down times" are lower than the determination standards, the self test is run at a timing determined by the check elapsed time. In this case, it can be assumed that the disk drive device 200 has a long remaining life, and it is thus better to obtain new self test results by running a self test.

On the other hand, when the current operating mode is a non-active mode, and at least one of the "number of spin-up times" and the "number of spin-down times" is at or over the determination threshold, the self test is run in synchronization with read or write commands to the disk drive device 200. Thus, in this case, the operating mode is prevented from switching from a non-active mode to the active mode just to run a self test. The life of the disk drive device 200 can thus be prevented from being shortened result from switching operating modes as a self test is run.

Other parameters, not just the "number of spin-up times" and the "number of spin-down times," can be used as parameters for the determination in step S520. For example, when any of the parameters in the threshold management table 126 illustrated in FIG. 5 are not less than the determination threshold, the instruction module 120 may move to step S530. Determination standards that are lower than the thresholds are used in order to prevent parameters from being over the threshold due to the self test. However, threshold values may be used as determination standards. Any conditions showing a relatively low possibility of malfunctions occurring in the near future can be used as conditions in step S520 for an instruction to run a self test regardless of whether there are read or write requests.

Various embodiments of processes can be used according to the status-determination mode. For example, the instruction module 120 may continue the process according to the status-determination mode. Alternatively, the status-determination mode may be used instead of the access timing mode in the procedure in FIG. 7.

The instruction module 120 may also determine, between steps S510 and S520, whether a self test has been executed immediately before the disk drive device 200 changes to a non-active mode. Here, when such self test results are obtained by the result obtaining module 121, the instruction module 120 may reset the check elapsed time to zero, without running a self test, and wait for the next timing for running a test. This can prevent the life of the disk drive device 200 form being shortened result from running self test.

F: Sixth Embodiment

F1: Device Configuration

Figure 13:
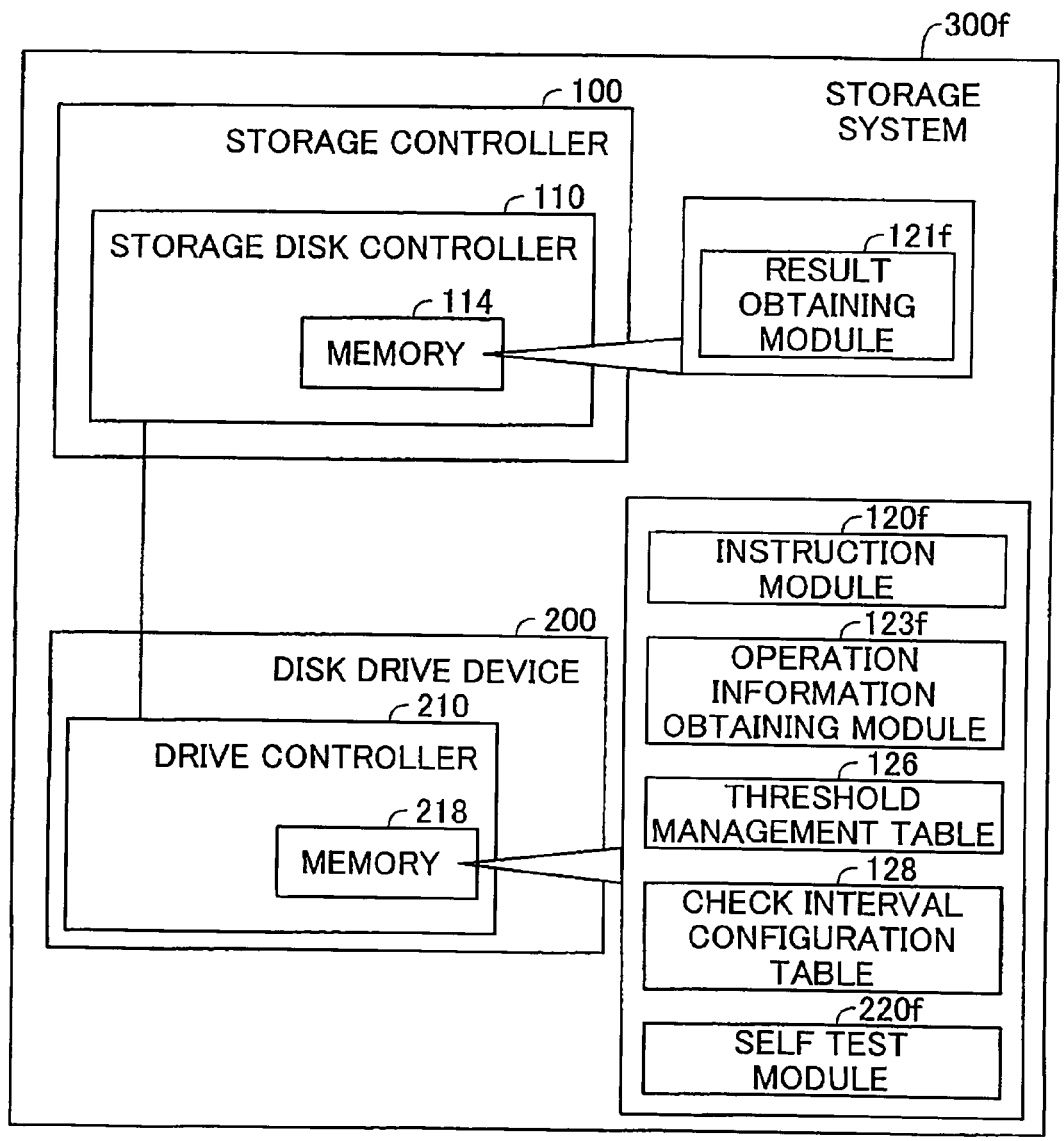
FIG. 13 is an illustration of the structure of the storage system 300$f$ in the sixth embodiment.

FIG. 13 illustrates the structure of a storage system 300f in a sixth embodiment. The difference form the storage system 300 in FIG. 1 is that the timing control process, that is, the determination of the timing for running a self test, is carried out by the instruction module 120f of the drive controller 210 instead of the storage disk controller 110. Thus, the instruction module 120f, operation information obtaining module 123f, threshold management table 126, and check interval configuration table 128 in the storage system 300f are stored in the memory 218 of the drive controller 210 instead of the storage disk controller 110. The other configuration is the same as that of the storage system 300 in FIG. 1.

In FIG. 13 only the memory 114 of the storage disk controller 110 and the result obtaining module 121f are illustrates as structural elements of the storage controller 100. The other structural elements are not illustrated. Only the memory 218 of the drive controller 210, the instruction module 120f, the operation information obtaining module 123f, the threshold management table 126, the check interval configuration table 128, and the self test module 220f are illustrates as structural elements of the disk drive device 200. The other structural elements are not illustrated. The structures of the disk drive devices 200a and 200b (FIG. 1) which are not illustrated in FIG. 13 are the same as the disk drive device 200 in FIG. 13.

F2: Timing Control Process

Figure 14:
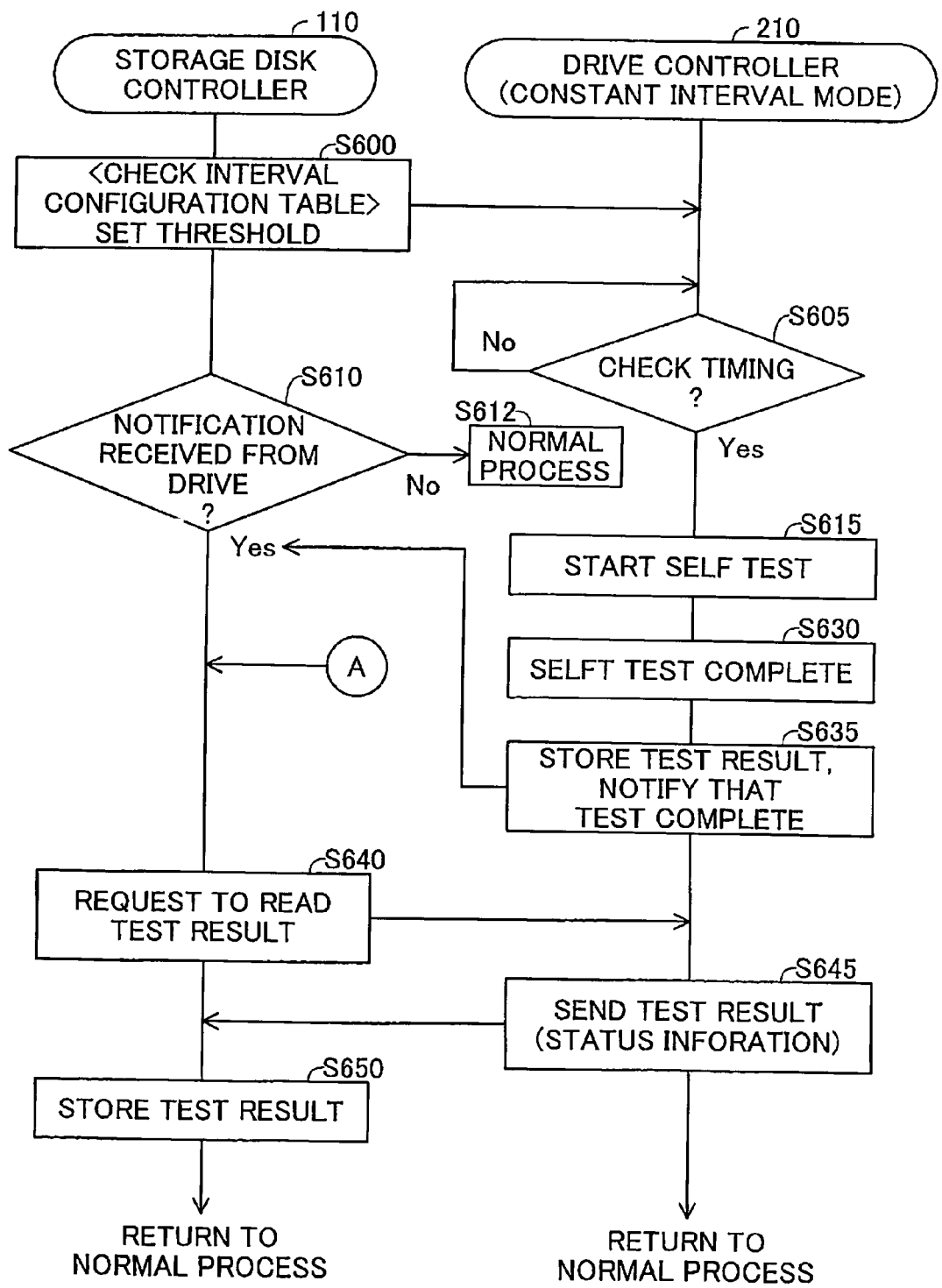
FIG. 14 is a flow chart of the procedure in the timing control process in the sixth embodiment.

FIG. 14 is a flow chart of the procedure for the timing control process in the sixth embodiment. In the example in FIG. 14, the instruction module 120f carries out the timing control process according to the constant interval mode in the same manner as in FIG. 8. The timing control process is carried out regardless of whether there are requests to reference the self test results. It is assumed that the disk drive device 200 is the target in the following description. However, the details of the process are the same when targeting the other disk drive devices 200a and 200b.

In the initial step S600, the storage disk controller 110 sends a threshold for the check interval configuration table 128 to the drive controller 210. The instruction module 120f then stores the received threshold in the check interval configuration table 128. The instruction module 120f then uses the threshold and the check elapsed time (current check interval value) to determine whether it is time to run a test. The storage disk controller 110 sends a predetermined threshold. This step S600 is preferably executed once after the disk drive device 200 is connected to the storage controller 100. The predetermined threshold may be stored in advance in the check interval configuration table 128. In this case, step S600 can be omitted.

In the next step S605, the instruction module 120f determines whether the present time is timing for running a self test. The process is the same as that in step S350 of FIG. 8. The instruction module 120f also updates the check elapsed time (current check interval value) using the timer (not shown) of the drive controller 210.

When the check elapsed time is not greater than the threshold, the instruction module 120f determines that it is not timing to run a test, and waits until the check elapsed time becomes over the threshold.

When the check elapsed time becomes over the threshold, the instruction module 120f instructs the self test module 220f to run a self test in the next step S615. The self test module 220f moves to step S635 when the self test is completed (step S630). In step S635, the self test module 220f stores the test results in RAM (not shown) of the drive controller 210, and sends notification that the test is completed to the storage disk controller 110.

Meanwhile, the result obtaining module 121f checks whether notification has been received from the drive controller 210 (S610). When there is no notification, the result obtaining module 121f moves to step S612 and waits for notification. The storage disk controller 110 continues the usual processing (such as the read or write process in response to read or write commands from the host computer 400).

The result obtaining module 121*f* moves to the next step S640 upon receiving notification from the drive controller 210 that the self test is completed (S610: Yes). In this step S640, the result obtaining module 121*f* sends a test-result-reading command to the drive controller 210. Then, in step S645, the self test module 220*f* sends the test results to the storage disk controller 110 upon receiving the command. The result obtaining module 121*f* stores the received test results in memory 114 in the next step S650. The instruction module 120*f* and self test module 220*f* then repeat the process in FIG. 14.

Although the timing control process related to the disk drive device 200 is described above, the details of the process are the same when targeting the other disk drive devices 200*a* and 200*b*.

In the sixth embodiment, the drive controller 210 (instruction module 120*f* and self test module 220*f*) autonomously run the self test without using instructions from the storage disk controller 110, as described above. The command traffic exchanged between the storage disk controller 110 and drive controller 210 is therefore reduced, allowing the load imposed on the communication lines between the controllers 110 and 210 to be reduced. In the sixth embodiment, the timing for running the self test is controlled by the drive controller 210 instead of the storage disk controller 110, allowing the structure of the storage disk controller 110 to be simplified. These advantages are good enough to allow a greater number of disk drive devices to be connected to the storage controller 100.

Various other timing modes, not just the constant interval mode, can be used as modes for the timing control process (timing mode) carried out by the instruction module 120*f*. For example, the timing modes described in the previous embodiments can be used. At such times, the instruction module 120*f* preferably carries out the process done by the instruction module 120 until an instruction is given to run a self test in the above timing modes, instead of step 605 in FIG. 14.

The access timing mode in FIG. 10 may be used, for example. In that case, the instruction module 120*f* preferably carries out the same processes as in steps S350 and S352 in FIG. 10 instead of step S605 in FIG. 14. In step S352, the instruction module 120*f* preferably detects, through the operation information obtaining module 123*f* which monitors the drive controller 210, that the drive controller 210 has received read or write commands from the storage controller 100.

The down timing mode in FIG. 3 may also be used. In that case, the instruction module 120*f* preferably detects, through the operation information obtaining module 123*f*, that the mode control module 222 (FIG. 1) is about to switch the operating mode from the active mode to a non-active mode, and gives an instruction to run a self test before the switch.

The up timing mode in FIG. 6 may also be used. In that case, the instruction module 120*f* preferably gives an instruction to run a self test responsive to switching the operating mode from a non-active mode to the active mode by the mode control module 222 (FIG. 1).

The access frequency mode in FIG. 11 may also be used. In that case, the instruction module 120*f* and operation information obtaining module 123*f* preferably carry out the same processed as in steps S400, S410, S420, and S430 in FIG. 11 instead of step S605 in FIG. 14.

The status-determination mode in FIG. 12 may also be used. In that case, the instruction module 120*f* and operation information obtaining module 123*f* preferably carry out the same processes as in steps S500, S510, S520, and S530 in FIG. 12 instead of step S605 in FIG. 14.

The instruction module 120*f* may select the timing mode according to the process in FIG. 7. In that case, other timing modes can be used instead of the access timing mode in the same manner as in the previous embodiments.

When the instruction module 120*f* carries out just the constant interval mode, the threshold management table 126 may be omitted from memory 218 (FIG. 13). The result obtaining module 121*f* may select the self test results that should be given according to the procedure in FIG. 4. In that case, the operation information obtaining module 123 (FIG. 1) and threshold management table 126 are stored in memory 114. Also in that case, the whole of the operation information obtaining module 123 and operation information obtaining module 123*f* correspond to the "operation information obtaining module" in the invention.

F3: Process for Continuous Absence of Completion Notification of the Self Test

Figure 15:
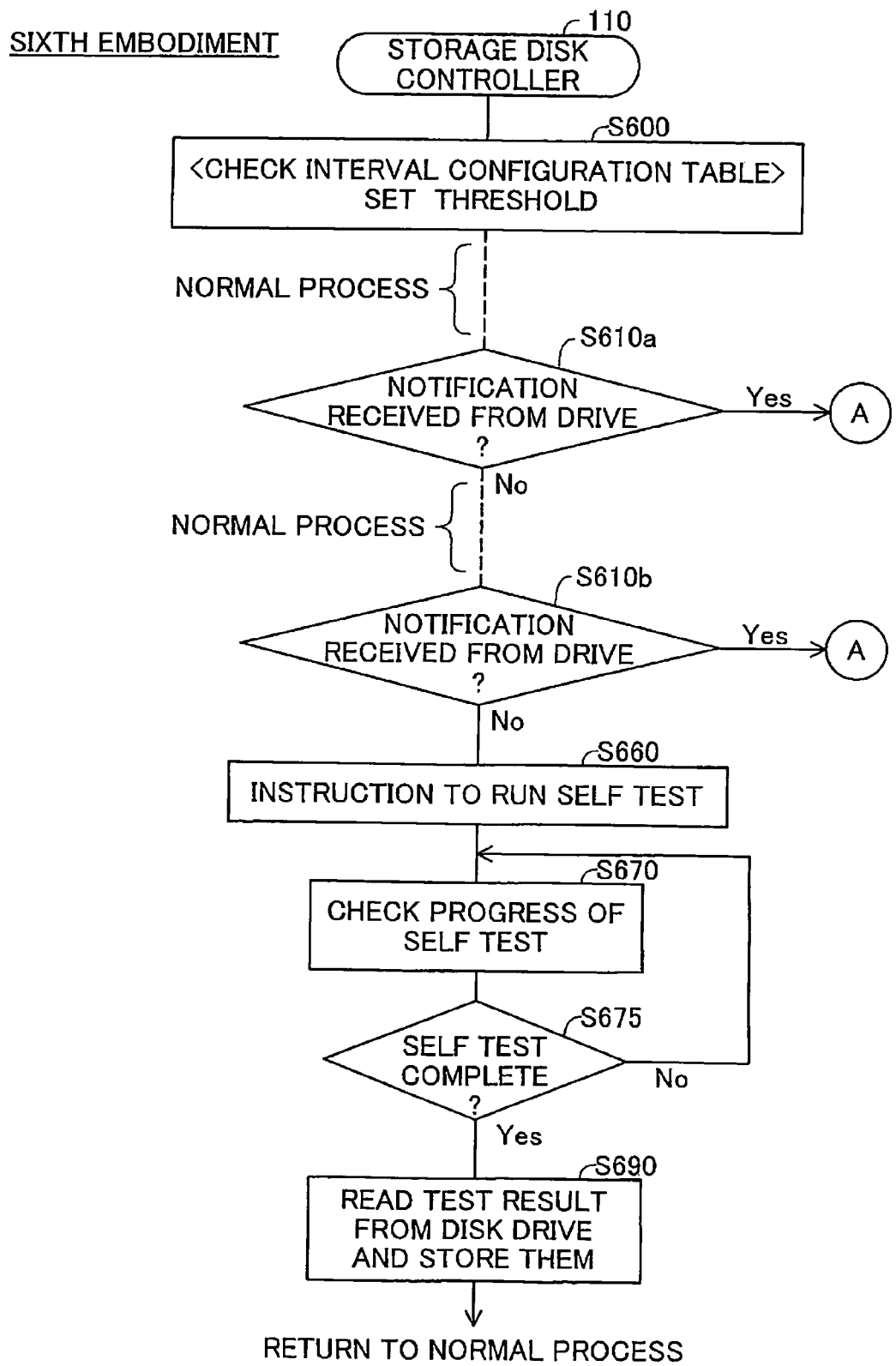
FIG. 15 is a flow chart of a procedure carried out when the result obtaining module 121$f$ (FIG. 13) continuously fails to receive notification that the self test is completed.

FIG. 15 is a flow chart of a procedure carried out when the result obtaining module 121*f* (FIG. 13) continuously fails to receive notification that the self test is completed. The first step S600 is the same as step S600 in FIG. 14. The result obtaining module 121*f* then waits for notification from the drive controller 210 that the self test is completed. Here, the result obtaining module 121*f* makes use of the timer (not shown) in the storage disk controller 110 to determine the time since the last notification of a complete self test was received (also referred to as the "notification elapsed time").

When notification that the test is completed arrives by the time the notification elapsed time is over the threshold established in step S600 (S610*a*: Yes), the result obtaining module 121*f* resets the notification elapsed time to zero, moves to step S640 in FIG. 14, and carries out the same process as in FIG. 14.

When the notification elapsed time is over the threshold and no notification that the test is completed has arrived (S610*a*: No), the result obtaining module 121*f* waits for notification that the self test is completed further for a period of time equal to the threshold. That is, the result obtaining module 121*f* waits for notification for a period of time twice as long as the threshold. Meanwhile, if notification that the test is completed arrives (S610*b*: Yes), the result obtaining module 121*f* resets the notification elapsed time to zero, moves to step S640 in FIG. 14, and carries out the same process as in FIG. 14.

If no notification that the test is completed arrives (S610*b*: No), the result obtaining module 121*f* sends an instruction to run a self test to the drive controller 210 and obtains the self test results from the drive controller 210 (S660 to S690). The processes in steps S660, S670, S675, and S690 are the same as the processes in steps S210, S220, S225, and S240 in FIG. 6 respectively. Here, when no normal self test results arrive, the result obtaining module 121*f* preferably issues notification of an abnormality.

Thus, in the sixth embodiment, when the disk drive device 200 autonomously runs a self test but no notification that the self test has been completed arrives, the result obtaining module 121*f* sends an instruction to the disk drive device 200 to run a self test. It is thus possible to prevent the storage controller 100 to be without the information about the malfunction for too long, despite the malfunction in the disk drive device 200.

Any time can be used, not just a time twice as long as the threshold, as the waiting time before sending an instruction to run the self test after the last completion notification of the self test has been received by the result obtaining module 121*f*. However, the waiting time preferably is longer than the usual self test repeated time intervals. This will allow the life of the disk drive device 200 from being shortened result from running too many self tests. Certain values can be used as the waiting time.

G: Seventh Embodiment

Figure 16:
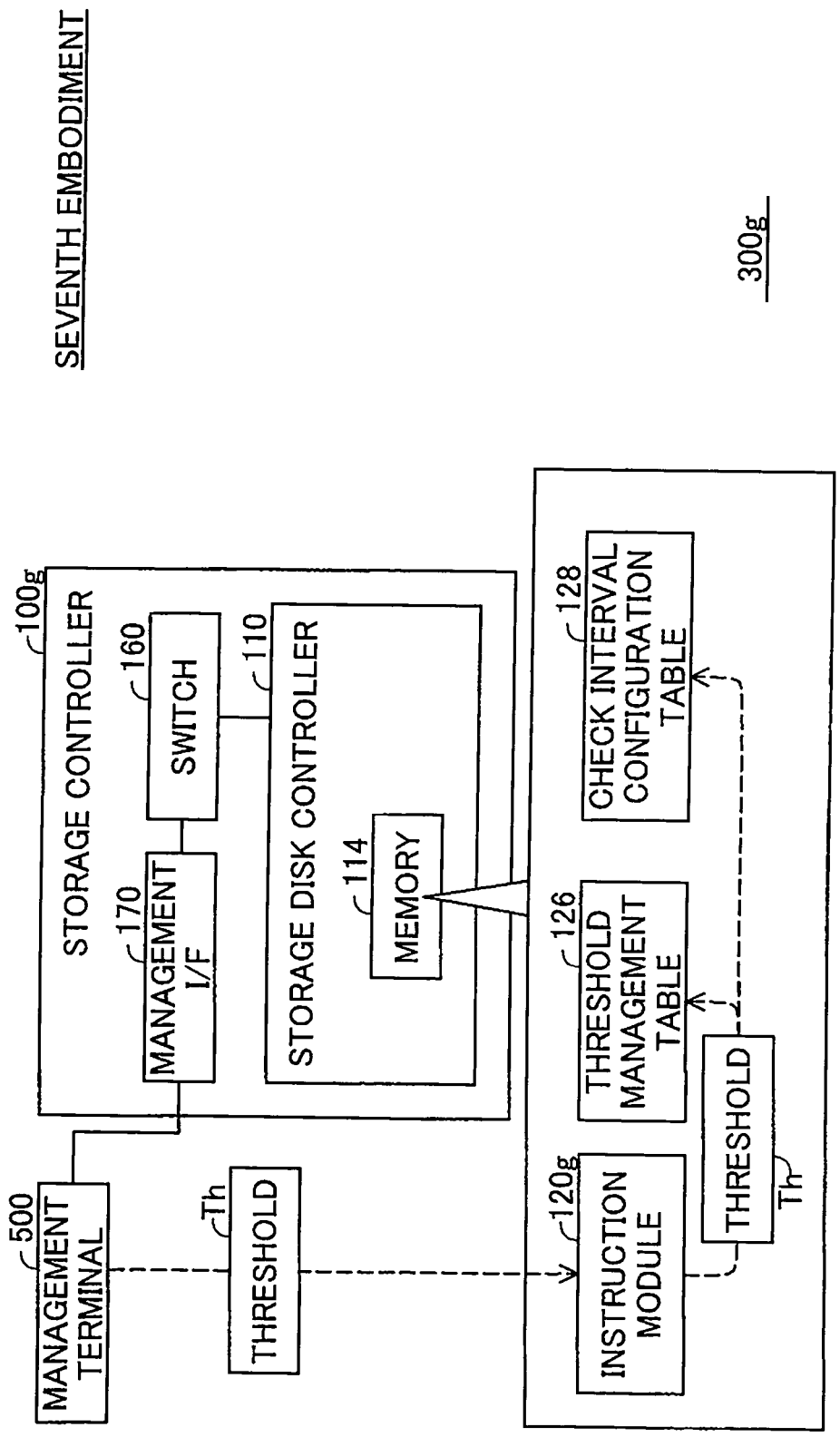
FIG. 16 is an illustration of an example of the structure of a storage system.

In each above embodiment, the instruction module may set the thresholds of the tables 126 and 128 according to requests to establish the thresholds. FIG. 16 illustrates an example of the structure of such a storage system 300*g*. The difference from the storage system 300 in FIG. 1 is that the storage controller 100*g* has a management interface (I/F) 170. A management terminal 500 is connected to the management I/F 170. The other structure is the same as the storage system 300 in FIG. 1. In FIG. 16, only portions of the storage controller 100*g* (management I/F 170, switch 160, storage disk controller 110, memory 114, instruction module 120*g*, threshold management table 126, and check interval configuration table 128) are shown as structural elements of the storage system 300*g*. The other structural elements are not shown.

The management terminal 500 has an input module (not shown) such as a keyboard or operating panel. The user operates the management terminal 500 (the input module) to define the thresholds Th of the tables 126 and 128. Here, various methods can be used to define the threshold Th. For example, the thresholds Th can be input directly by the user, or the user can designate data files storing the thresholds Th. According to instructions from the user, the management terminal 500 sends requests to set the threshold to the designated threshold Th to the storage controller 100*g*. The instruction module 120*g* sets the thresholds of the tables 126 and 128 to the designated threshold Th that have been received according to the received requests.

In this way, in the seventh embodiment, the instruction module 120*g* can set the thresholds according to requests to set thresholds. The instruction module 120*g* can thus use thresholds suited to the utilization status of the storage system 300*g* to carry out the timing control process. Threshold suitable for the disk drive devices can be used, for example. This advantage is particularly evident in cases where disk drive devices connected to the storage controller 100*g* are exchanged with other types of disk drive devices having different specifications.

Similarly, the instruction module 120*g* may establish the waiting time used in the embodiment in FIG. 15 according to establishment requests. It is also possible to set only part of the thresholds (such as only the check interval configuration table 128 threshold) in the threshold management table 126 and check interval configuration table 128.

H: Eighth Embodiment

Figure 17:
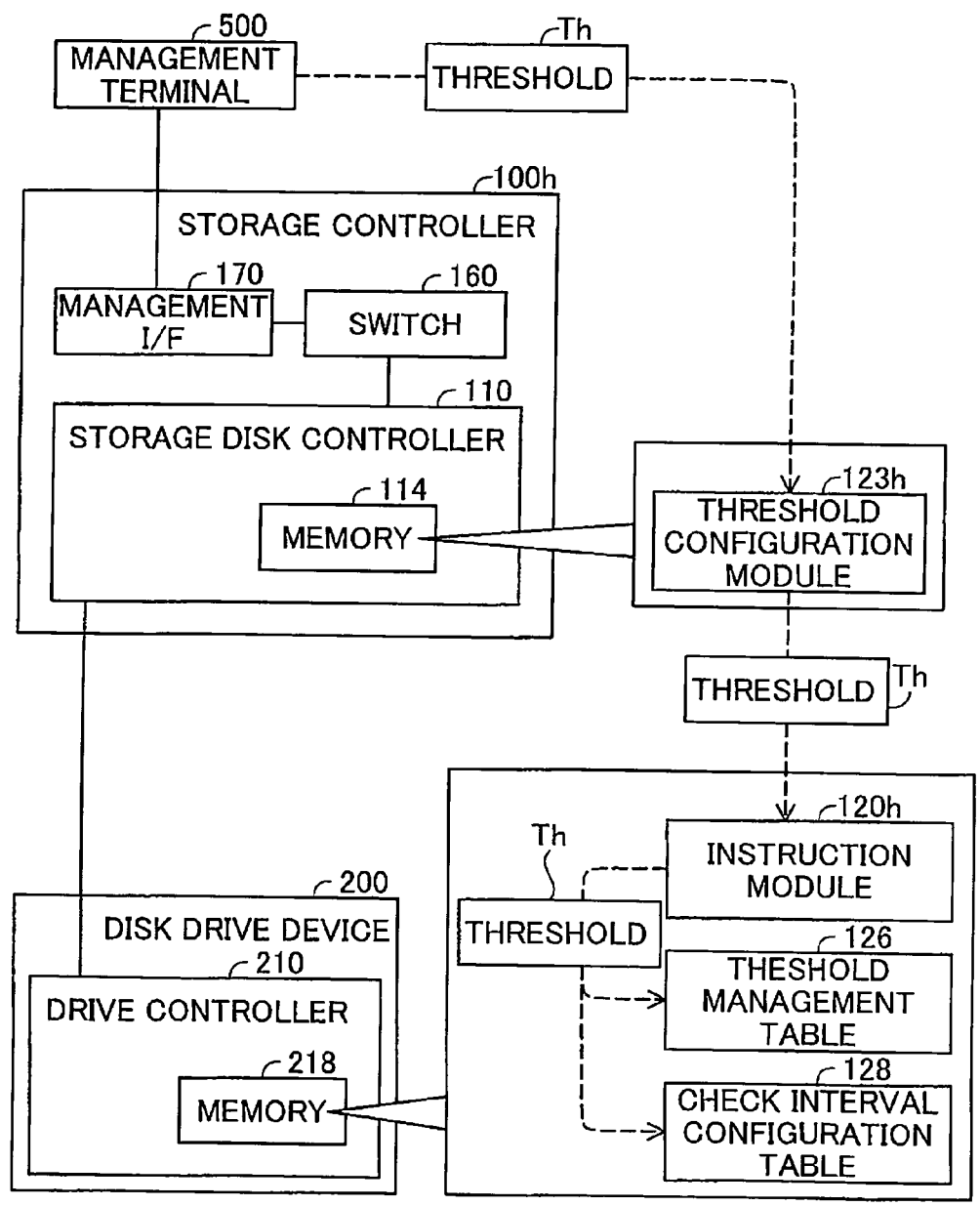
FIG. 17 is an illustration of an example of the structure of a storage system.

In each above embodiment, the instruction module may set the thresholds of the tables 126 and 128 according to requests to set the thresholds. FIG. 17 illustrates an example of the structure of such a storage system 300*h*. There are two differences from the storage system 300*f* in FIG. 13. The first difference is that the storage controller 100*h* has a management interface (I/F) 170. A management terminal 500 is connected to the management I/F 170. The second difference is that the memory 114 stores a threshold configuration module 123*h*. The other structure is the same as the storage system 300*f* in FIG. 13. In FIG. 17, only portions of the storage controller 100*h* (management I/F 170, switch 160, storage disk controller 110, memory 114, and threshold configuration module 123*h*) and portions of the disk drive device 200 (the drive controller 210, the memory 218, the instruction module 120*h*, the threshold management table 126, and the check interval configuration table 128) are shown as structural elements of the storage system 300*h*. The other structural elements are not shown.

The configuration and function of the management terminal 500 is the same as those of the management terminal 500 in FIG. 16. The management terminal 500 sends requests to set the threshold to the designated threshold Th to the storage controller 100*h* in response to instructions input by the user. In response to the requests, the threshold configuration module 123*h* sends the requests to set the thresholds of the tables 126 and 128 to the received designated thresholds Th to the drive controller 210. The instruction module 120*h* sets the thresholds of the tables 126 and 128 to the designated thresholds Th that have been received according to the received requests.

Thus, in the eighth embodiment, the instruction module 120*h* can set the thresholds according to requests to set the thresholds. The threshold configuration module 123*h* can also send the same requests to set the thresholds to the drive controller 210 (instruction module 120*h*) according to the requests to set the thresholds. The instruction module 120*h* can thus use thresholds suitable for the utilization status of the storage system 300*h* to carry out the timing control process. For example, thresholds suitable for the disk drive devices can be used.

I: Ninth Embodiment

Figure 18:
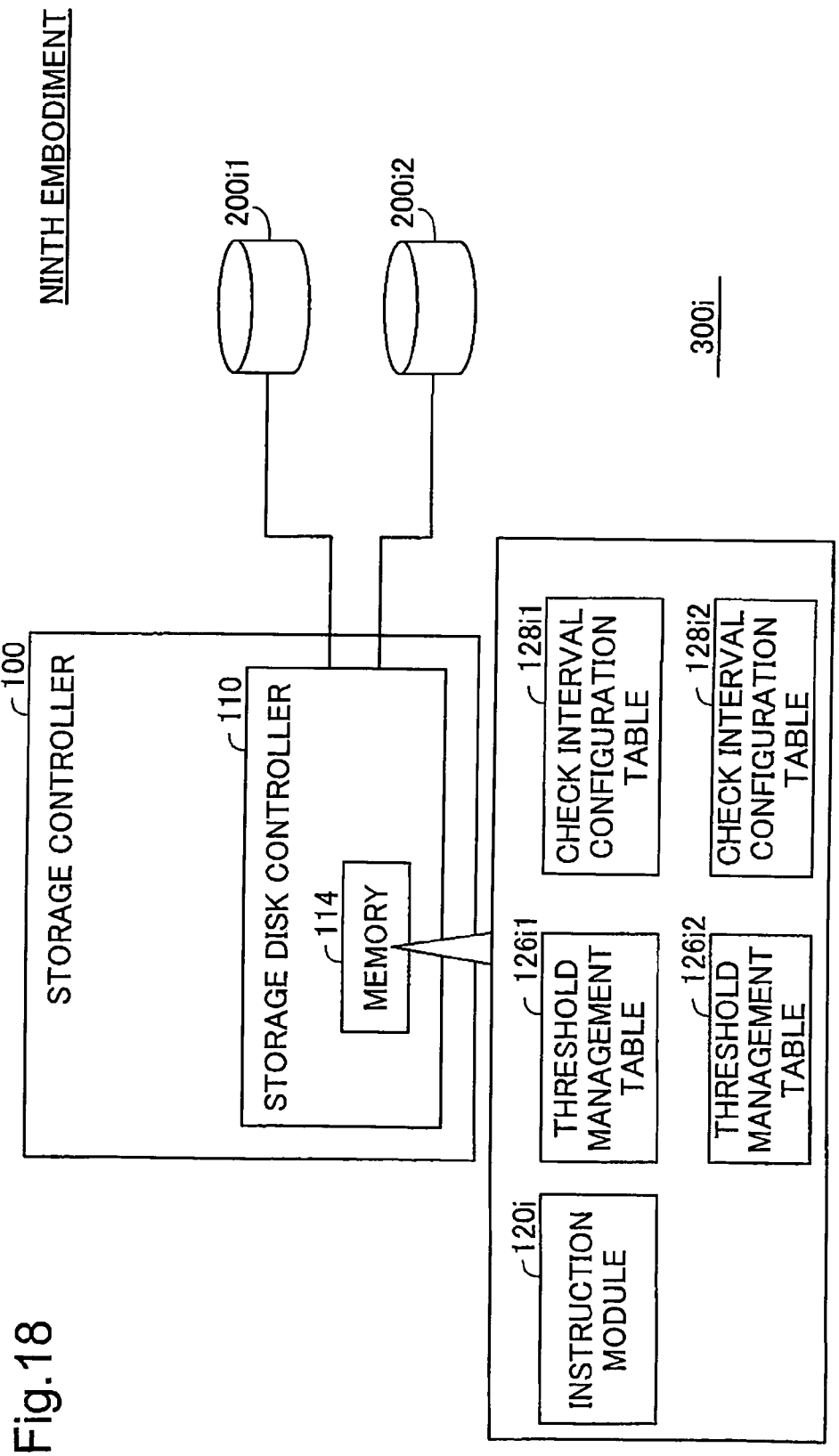
FIG. 18 is an illustration of an example of the structure of a storage system.

In each above embodiment, shared thresholds (in the tables 126 and 128) were used for the plurality of disk drive devices, but independent thresholds may also be used for each disk drive device. FIG. 18 illustrates an example of the structure of such a storage system 300*i*. The difference from the storage system 300 in FIG. 1 is that a first table set (126*i*1 and 128*i*1) and a second table set (126*i*2 and 128*i*2) are stored in memory 114. Between these two table sets, the thresholds of at least part of the parameters are different from each other. Two disk drive devices 200*i*1 and 200*i*2 are also connected to the storage controller 100. The other structure is the same as that of the storage system 300 in FIG. 1. In FIG. 18, only portions of the storage controller 100 (the storage disk controller 110, memory 114, instruction module 120*i*, threshold management tables 126*i*1 and 126*i*2, and check interval configuration tables 128*i*1 and 128*i*2) and the disk drive devices 200*i*1 and 200*i*2 are shown as structural elements of the storage system 300. The other structural elements are not shown.

The instruction module 120*i* carries out the same timing control process as in the above embodiments on the disk drive devices 200*i*1 and 200*i*2. Here, the instruction module 120*i* uses the first threshold management table 126*i*1 and the first check interval configuration table 128*i*1 to control the first disk drive device 200*i*1, and uses the second threshold management table 126*i*2 and the second check interval configuration table 128*i*2 to control the second disk drive device 200*i*2.

Thus, in the ninth embodiment, the instruction module 120*i* carries out the timing control process on the two disk drive devices 200*i*1 and 200*i*2 by using thresholds that are different from each other. The instruction module 120*i* can thus carry out timing control processes suitable for the disk drive devices 200*i*1 and 200*i*2 respectively.

Although the instruction module 120i was described above, the result obtaining module (not shown) may also similarly use thresholds that are different from each other to carry out the process for selecting test results (FIG. 4) on the two disk drive devices 200i1 and 200i2. This will allow the result obtaining module to obtain test results suitable for the disk drive devices 200i1 and 200i2 respectively.

The total number of disk drive devices connected to the storage controller can be any number of 2 or more. Here, independent thresholds may be used for each disk drive device. The plurality of disk drive devices may also be divided into a plurality of groups to use independent thresholds per group. In that case, thresholds are shared by the disk drive devices in one group. Any method can be used to form such groups. For example, one or more disk drive devices having the same specifications may be assigned to a group.

The instruction module 120i may also set thresholds according to requests to set thresholds in the same manner as in the embodiment in FIG. 16.

J: Variants

Elements other than the elements claimed in the independent claims among the structural elements in each above embodiment are additional parts and can be omitted as desired. The invention is not limited to the above embodiments, and can be implemented in a variety of embodiments without departing from the spirit thereof. The following variants are examples.

Variant 1

In each above embodiment, the operating mode of the disk drive device need not necessarily be controlled according to the access frequency. However, the advantages in the above embodiments are particularly evident in storage systems in which the operating modes of at least part of disk drive devices with no access is deliberately switched to a non-active mode, such as MAID. Here, the total number of disk drive devices provided in the storage system may be "1," or any number of 2 or more. However, the effects of the MAID technique are particularly evident when using a plurality of disk drive devices.

Variant 2

In the first and second embodiments described above, check interval configuration table 128 (FIG. 1) is infrequently-used, and the check interval configuration table 128 may thus be omitted.

Variant 3

In the above embodiments, various parameters, not just the parameters in FIG. 5, may be used as parameters representing the operating history of the disk drive device. For example, various parameters with a positive correlation to the amount of read data and written data (also referred to as "data quantity parameter") can be used. For example, the total number of data blocks (sectors) requested by at least one of the read command and the write command or the above "number of R/W" can be used as data quantity parameters.

Because "data quantity parameter" and the number of "spin-up," "spin-down," "power-on," and "power-off" are parameters representing the amount of processing carried out by the disk drive device 200, they have a particularly strong correlation to the life of the disk drive device 200. Therefore, at least part of these parameters preferably is used to determining the possibility of malfunctions occurring in the disk drive device 200 in the near future (such as S175 in FIG. 4, S308 in FIG. 7, and S520 in FIG. 12).

Various values related to frequency, not just the number of times within a certain period of time, can be used as parameter frequencies. For example, the elapsed time since the last process was carried out can be used. For example, the time since the last spin-up of the disk drive device 200 can be used as the "spin-up frequency." The same is true of other parameter frequencies.

Variant 4:

Various conditions, not just the conditions in FIG. 4, can be used as conditions making use of existing stored self test results in memory 114 in the above embodiments. For example, the existing self test results stored in memory 114 may always be used. However, the possibility of malfunctions occurring in the disk drive device in the near future is preferably determined based on parameters representing the operating history of the disk drive device, as in the embodiment in FIG. 4, and the results stored in memory 114 is preferably used without running a self test when the possibility is determined to be relatively high, while the results of a new self test is preferably used when the possibility is determined to be relatively low. This can prevent the difference in time from becoming too great between the times when a self test is run and the time when the self test results are used. The balance can thus be achieved between reliability of the self check results when making use of the self check results, and preventing the shortening of disk drive device life caused by such self checks.

The self test result of a new self test is preferably used when the operating mode of the disk drive device is the mode in which the self test can be run without switching the operating mode (such as the active mode), as in the embodiment in FIG. 4. This will allow new self test results to be obtained while preventing the life of the disk drive device 200 from being shortened result from switching the operating mode.

Variant 5:

In the embodiments of FIGS. 10, 11, and 12, any timing, not just constant interval timing, can be used as the timing for confirming necessity of instructions to run a self test. For example, instructions by user can be used as the trigger for confirming the necessity. The necessity can also be confirmed according to a certain schedule.

Variant 6:

In the embodiments illustrated in FIGS. 16 and 17, any device, not just a management terminal 500, can be used as a device to issue requests to set the thresholds. For example, the host computer 400 (FIG. 1) may send requests to set the thresholds to the storage controllers 100g and 100h. The storage disk controller 110, not just external devices connected to the storage controllers 100g and 100h, may issue requests to set the thresholds.

Variant 7:

In the above embodiments, the instruction module 120 and result obtaining module 121 used shared thresholds (such as the threshold management table 126), but these modules 120, 121 may use different thresholds. The result obtaining module 121 may set thresholds (such as the thresholds of the threshold management table 126 in memory 114) used in step S175 of FIG. 4 according to requests to set the thresholds in the same manner as the instruction module 120g in the embodiment in FIG. 16.

Variant 8

In the above embodiments, various other connection modes may be employed to connect the storage controller and drive controller. For example, data transmission lines, command or status data (such as operating mode information) transmission lines may be independently established.

Variant 9

In the above embodiments, nonvolatile memory is preferably used as the memory storing the self test results. In this way, the self test results will be stored in nonvolatile memory even when power to the storage controller 100 or the disk drive device 200 is turned off. As a result, the self test results can be used immediately after the power is turned ON.

The self test results may also be stored in memory 150 (FIG. 1). In this way, the self test results obtained by the controllers 110 will be stored in shared memory 150, even when a plurality of storage disk controllers 110 are provided in a single storage controller 100. The process for referencing self test can thus be simplified because self test results is referenced by access to only the memory 150 instead of to each controller 110.

Variant 10:

In the above embodiments, the timing control process was carried out for each disk drive device, but the timing control process may also be carried out for a plurality of disk drive devices. In that case, the self test will be run at the same timing for a group of disk drive devices. Any group can be used as such a group. For example, in some cases, a logical storage area (also referred to as logical volume) may be formed using a plurality of disk drive devices. In such cases, the plurality of disk drive devices forming the one logical volume may be handled as one group.

Variant 11:

In the above embodiments, portions of the structure realized by software may be replaced by hardware, and vice versa. For example, the function of the data relay module 122 (FIG. 1) may be realized by a hardware circuitry having logical circuits.

Variant 12:

Various aspects of the invention are previously discussed in this specification. In a first aspect, the test instruction module has a second timing mode for determining a second timing to issue an instruction to execute the testing process, the second timing being different from the first timing, wherein responsive to a trigger for selection of the timing mode, the test instruction module:
  determines whether or not a given first timing condition is satisfied by second operation information which is at least part of the operation information;
  (i) when the first timing condition is met, determines the timing for issuing an instruction to execute the testing process according to the first timing mode; and
  (ii) when the first timing condition is not met, determines the timing for issuing an instruction to execute the testing process according to the second timing mode.

In this arrangement, a balance can be achieved between reliability of a self check result when making use of the self check result, and preventing the shortening of disk drive device life caused by such the self check, because the mode for determining the timing is selected based on second operation information which is at least part of the operation information.

In the above storage system, the test instruction module may send the instruction to execute the testing process at periodic intervals in the above second timing mode.

This arrangement can improve the reliability of the self check result when using the self check result because the test is carried out at periodic intervals in the second timing mode.

In the above storage system, the disk drive device preferably has a plurality of operating modes including an up operating mode and a down operating mode. In the up operating mode, the disk drive device operates in a state closer to a state when the disk drive device is reading or writing data than in the down operating mode. The second operation information preferably includes at least one of the parameters among (1) the number of times the operating mode of the disk drive device has changed from the up to the down operating mode, (2) the number of times the disk drive device operating mode has changed from the down to the up operating mode, (3) the number of times the disk drive device power source has been switched from ON to OFF, (4) the number of times the disk drive device power source has been switched from OFF to ON, and (5) value which is positively correlated with the amount of read data and written data targeting the disk drive device. The first timing condition preferably includes that at least one of the parameters included in the second operation information is over a given threshold level.

The up or down number of times, the power ON or OFF number of times, and the value positively correlated with the amount of read or written data are strongly correlated to the life of the disk drive device. Thus, in this arrangement, selection suitable for the state of the disk drive device can be done because at least one of these parameters is used in the timing mode selection condition.

In a second aspect, the disk drive device has a plurality of operating modes including an up operating mode and a down operating mode, in the up operating mode, the disk drive device operates in a state closer to a state when the disk drive device is reading or writing data than in the down operating mode, responsive to a reference request for the result of the testing process, the result obtaining module determines whether or not the current operating mode of the disk drive device is the up operating mode,
  (A) when the operating mode is the up operating mode, sends an instruction to execute the testing process to the testing module so as to obtain a new testing process result and provides the new testing process result,
  (B) when the operating mode is not the up operating mode, determines whether or not a given executable condition is satisfied by third operation information which is at least part of the operation information, and which includes information of the current operating mode of the disk drive device,
    (B1) when the executable condition is met, sends an instruction to execute the testing process to the testing module so as to obtain a new testing process result and provides the new testing process result that have been obtained, and
    (B2) when the executable condition is not met, provides a test result that has already been obtained according to the instruction from the test instruction module, without sending an instruction to execute the testing process to the testing module.

In this arrangement, a balance can be achieved between reliability of a self check result when making use of the self check result, and preventing the shortening of disk drive device life caused by such the self check, because when the test result is requested for reference, determination whether to provide a result of a new testing process or a existing test result is done based on third operation information (includes information of current operating mode of the disk drive device) which is at least part of the operation information.

In the above storage system, the third operation information preferably includes at least one of the parameters among (1) the number of times the operating mode of the disk drive device has changed from the up to the down operating mode, (2) the number of times the disk drive device operating mode has changed from the down to the up operating mode, (3) the number of times the disk drive device power source has been switched from ON to OFF, (4) the number of times the disk drive device power source has been switched from OFF to ON, and (5) value which is positively correlated with the amount of read data and written data targeting the disk drive device. The executable condition preferably includes that each parameter included in the third operation information is not greater than a given threshold level respectively.

The up or down number of times, the power ON or OFF number of times, and the value positively correlated with the amount of read or written data are strongly correlated to the life of the disk drive device. Thus, in this arrangement, selection suitable for the state of the disk drive device can be done because at least one of these parameters is used in the test result selection condition.

In the above storage system, the result obtaining module may establish the threshold according to a given threshold-establishing request.

Because the threshold is established according to the request in this arrangement, the result obtaining module can use the threshold suited to the storage system utilization status.

The above storage system may comprise a storage control module that is connected to the host computer and to the disk drive device. The storage control module is configured to control the disk drive device according to a request from the host computer. Here the test instruction module, the result obtaining module, and the operation information obtaining module are preferably provided in the storage control module. Furthermore the disk drive device includes a first and a second disk drive device, and the executable condition includes a first and a second executable condition. Then the result obtaining module preferably carries out a process on the first disk drive device using the first executable condition, and carries out a process on the second disk drive device using the second executable condition.

In this arrangement, the result obtaining module can obtain results suitable for each of the first and the second disk drive device respectively.

In a 3rd aspect,
the disk drive device has a plurality of operating modes including an up operating mode and a down operating mode,
in the up operating mode, the disk drive device operates in a state closer to a state when the disk drive device is reading or writing data than in the down operating mode,
the first operation information includes a down-trigger by which the disk drive device operating mode is moved from the up operating mode to the down operating mode, and
the test instruction module has a down timing mode as the first timing mode, wherein
in the down timing mode, the test instruction module sends an instruction to execute the testing process to the testing module responsive to the down-trigger, so that the testing process is carried out by the testing module before the operating mode shifts.

This arrangement allows an existing test result to be used instead of a new test result without compromising reliability of the test result when using the test result because the testing process is carried out as the operating mode shifts from up operating mode to down operating mode.

In a 4th aspect,
the disk drive device has a plurality of operating modes including an up operating mode and a down operating mode, in the up operating mode, the disk drive device operates in a state closer to a state when the disk drive device is reading or writing data than in the down operating mode,
the first operation information includes an up-trigger by which the disk drive device operating mode is moved from the down operating mode to the up operating mode, and
the test instruction module has an up timing mode as the first timing mode, wherein
in the up timing mode, the test instruction module sends an instruction to execute the testing process to the testing module responsive to the upward trigger, so that the testing process is carried out by the testing module after the operating mode shifts.

This arrangement allows an existing test result to be used instead of a new test result without compromising reliability of the test result when using test result because the testing process is carried out as the operating mode shifts from down operating mode to up operating mode.

In a 5th aspect,
the first operation information includes a trigger for starting a reading or writing operation targeting the disk drive device, and
the test instruction module has an access timing mode as the first timing mode, wherein
in the access timing mode, the test instruction module sends an instruction to execute the testing process to the testing module after receiving a given trigger for confirming of necessity of a testing process instruction, and then receiving the trigger for starting a reading or writing operation targeting the disk drive device.

The life of the disk drive device can be prevented from being shortened by the testing process because the testing process is run synchronously with access.

In a 6th aspect,
the test instruction module has a status-execute timing mode as the first timing mode, wherein
in the status-execute timing mode, the test instruction module
determines whether or not the first operation information meets a given status-execute condition, responsive to a given trigger for confirming of necessity of issuing a testing process instruction,
(i) when the status-execute condition is met, sends an instruction to execute the testing process to the testing module, and
(ii) when the status-execute condition is not met, waits until a next trigger for confirming of necessity of issuing a testing process instruction without sending an instruction to execute the testing process to the testing module.

In this arrangement, a balance can be achieved between reliability of a self check result when making use of the self check result, and preventing the shortening of disk drive device life caused by such the self check, because the decision to run the testing process is determined according to whether or not the first operation information meets the given status-execute condition.

In the above storage system, the first operation information preferably includes a frequency parameter which is positively correlated with the read or write frequency targeting the disk drive device. Furthermore the status-execute condition preferably includes that frequency represented by the frequency parameter is less than a given threshold level.

Because the testing process is not carried out in this arrangement when the current read or write frequency is relatively high, the life of the disk drive device can be prevented from being shortened by the testing process.

In a 7th aspect, the disk drive device has a plurality of operating modes including an up operating mode and a down operating mode, in the up operating mode, the disk drive device operates in a state closer to a state when the disk drive device is reading or writing data than in the down operating mode, the first operation information includes a trigger for reading or writing data targeting the disk drive device and information of current operating mode of the disk drive device, and the test instruction module has a status-determination mode as the first timing mode, wherein in the status-determination mode, the test instruction module responsive to a given trigger for confirming of necessity of a testing process instruction, determines whether or not the current operating mode of the disk drive device is the down operating mode, (A) when the operating mode is not the down operating mode, sends an instruction to execute the testing process to the testing module, (B) when the operating mode is the down operating mode, determines whether or not a given status-determination condition is satisfied by the first operation information, (B1) when the status-execute condition is met, sends an instruction to execute the testing process to the testing module, and (B2) when the status-determination condition is not met, suspends sending of an instruction to execute the testing process, and sends an instruction to execute the testing process to the testing module responsive to a trigger for reading or writing data targeting the disk drive device.

In this arrangement, a balance can be achieved between reliability of a self check result when making use of the self check result, and preventing the shortening of disk drive device life caused by such the self check, because the timing for running the testing process is determined based on the first operation information, including trigger for reading/writing targeting the disk drive device and the current operating mode of the disk drive device.

In the above storage system, the first operation information preferably comprises at least one of the parameters among (1) the number of times the operating mode of the disk drive device has changed from the up to the down operating mode, (2) the number of times the disk drive device operating mode has changed from the down to the up operating mode, (3) the number of times the disk drive device power source has been switched from ON to OFF, (4) the number of times the disk drive device power source has been switched from OFF to ON, and (5) value which is positively correlated with the amount of read data and written data targeting the disk drive device. The status-determination condition preferably includes that each parameter included in the first operation information is not greater than a given threshold level respectively.

The up or down number of times, the power ON or OFF number of times, and the value positively correlated with the amount of read or written data are strongly correlated to the life of the disk drive device. Thus, in this arrangement, timing suitable for the state of the disk drive device can be determined because at least one of these parameters is used in determining the timing for the testing process.

In the 1st, 6th and 7th aspects, the storage system may comprise a storage control module that is connected to the host computer and to the disk drive device. The storage control module is configured to control the disk drive device according to a request from the host computer. Here the test instruction module, the result obtaining module, and the operation information obtaining module are preferably provided in the storage control module. Furthermore the disk drive device includes a first and a second disk drive device, and the condition includes a first drive condition and a second drive condition. Then the test instruction module preferably carries out a process on the first disk drive device using the first drive condition, and carries out a process on the second disk drive device using the second drive condition.

This arrangement allows the test instruction module to give an instruction at a timing suited to each disk drive device.

In the 1st, 6th and 7th aspects, the test instruction module may establish the threshold according to a given threshold establishment request.

Because the threshold is established according to the request in this arrangement, the test instruction module can use threshold suited to the storage system utilization status.

In the 1st, 6th and 7th aspects, the storage system may comprise a storage control module that is connected to the host computer and to the disk drive device. The storage control module is configured to control the disk drive device according to a request from the host computer. Here the result obtaining module is provided in the storage control module, and the test instruction module and the operation information obtaining module are provided in the disk drive device. Furthermore, the storage control module preferably has a threshold-establishing module configured to send a threshold-establishing request to the test instruction module according to a given threshold-establishing request. The test instruction module preferably establishes the threshold according to the received threshold-establishing request.

Because the threshold is established according to the request in this arrangement, the test instruction module can use the threshold suited to the storage system utilization status.

In a 8th aspect, the storage system further has:

a storage control module connected to the host computer and the disk drive device, the storage control module being configured to control the disk drive device according to a request from the host computer, wherein the result obtaining module is provided in the storage control module, and the test instruction module and the operation information obtaining module are provided in the disk drive device.

This arrangement can simplify the structure of the storage control module.

In the above storage system, the test instruction module may send a notification of completion to the storage control module responsive to the completion of the testing process. Then the result obtaining module preferably obtains a result of the testing process from the disk drive device responsive to receiving the notification of completion.

This arrangement allows the result obtaining module to properly obtain the test result.

In the above storage system, the result obtaining module preferably sends an instruction to execute the testing process to the testing module when a given waiting time has elapsed without receiving the notification of completion.

Regardless of a problem occurring in the disk drive device, this arrangement can prevent the result obtaining module from being without information about the problem for too long.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage system for providing a host computer with a data read/writable storage area, comprising:
a disk drive device having a storage area and a testing module configured to execute a testing process for operation of the disk drive device;
a test instruction module configured to send an instruction to execute the testing process to the testing module;
a result obtaining module configured to obtain a result of the testing process; and
an operation information obtaining module configured to obtain operation information including an operating history of the disk drive device,
wherein, the test instruction module has a first timing mode for determining a first timing to issue an instruction to execute the testing process, based on a first operation information which is at least part of the operation information that includes the operating history of the disk drive device.

2. A storage system in accordance with claim 1, wherein
the test instruction module has a second timing mode for determining a second timing to issue an instruction to execute the testing process, the second timing being different from the first timing, wherein
responsive to a trigger for selection of the timing mode, the test instruction module:
determines whether or not a given first timing condition is satisfied by second operation information which is at least part of the operation information;
(i) when the first timing condition is met, determines the timing for issuing an instruction to execute the testing process according to the first timing mode; and
(ii) when the first timing condition is not met, determines the timing for issuing an instruction to execute the testing process according to the second timing mode.

3. A storage system in accordance with claim 1, wherein
the disk drive device has a plurality of operating modes including an up operating mode and a down operating mode,
in the up operating mode, the disk drive device operates in a state closer to a state when the disk drive device is reading or writing data than in the down operating mode,
responsive to a reference request for the result of the testing process, the result obtaining module
determines whether or not the current operating mode of the disk drive device is the up operating mode,
(A) when the operating mode is the up operating mode, sends an instruction to execute the testing process to the testing module so as to obtain a new testing process result and provides the new testing process result,
(B) when the operating mode is not the up operating mode, determines whether or not a given executable condition is satisfied by third operation information which is at least part of the operation information, and which includes information of the current operating mode of the disk drive device,
(B1) when the executable condition is met, sends an instruction to execute the testing process to the testing module so as to obtain a new testing process result and provides the new testing process result that have been obtained, and
(B2) when the executable condition is not met, provides a test result that has already been obtained according to the instruction from the test instruction module, without sending an instruction to execute the testing process to the testing module; and
the operation information further includes an operating state of the disk drive device.

4. A storage system in accordance with claim 1, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes a down-trigger by which the disk drive device operating mode is moved from the up operating mode to the down operating mode, and
the test instruction module has a down timing mode as the first timing mode, wherein
in the down timing mode, the test instruction module sends an instruction to execute the testing process to the testing module responsive to the down-trigger, so that the testing process is carried out by the testing module before the operating mode shifts.

5. A storage system in accordance with claim 1, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes an up-trigger by which the disk drive device operating mode is moved from the down operating mode to the up operating mode, and
the test instruction module has an up timing mode as the first timing mode, wherein
in the up timing mode, the test instruction module sends an instruction to execute the testing process to the testing module responsive to the up-trigger, so that the testing process is carried out by the testing module after the operating mode shifts.

6. A storage system in accordance with claim 1, wherein
the first operation information includes a trigger for starting a reading or writing operation targeting the disk drive device, and
the test instruction module has an access timing mode as the first timing mode, wherein
in the access timing mode, the test instruction module sends an instruction to execute the testing process to the testing module after receiving a given trigger for confirming of necessity of a testing process instruction, and then receiving the trigger for starting a reading or writing operation targeting the disk drive device.

7. A storage system in accordance with claim 1, wherein
the test instruction module has a status-execute timing mode as the first timing mode, wherein
in the status-execute timing mode, the test instruction module
determines whether or not the first operation information meets a given status-execute condition, responsive to a given trigger for confirming of necessity of issuing a testing process instruction,
(i) when the status-execute condition is met, sends an instruction to execute the testing process to the testing module, and
(ii) when the status-execute condition is not met, waits until a next trigger for confirming of necessity of issuing a testing process instruction without sending an instruction to execute the testing process to the testing module.

8. A storage system in accordance with claim 1, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes a trigger for reading or writing data targeting the disk drive device and information of current operating mode of the disk drive device, and
the test instruction module has a status-determination mode as the first timing mode, wherein
in the status-determination mode, the test instruction module
responsive to a given trigger for confirming of necessity of a testing process instruction, determines whether or not the current operating mode of the disk drive device is the down operating mode,
(A) when the operating mode is not the down operating mode, sends an instruction to execute the testing process to the testing module,
(B) when the operating mode is the down operating mode, determines whether or not a given status-determination condition is satisfied by the first operation information,
(B1) when the status-execute condition is met, sends an instruction to execute the testing process to the testing module, and
(B2) when the status-determination condition is not met, suspends sending of an instruction to execute the testing process, and sends an instruction to execute the testing process to the testing module responsive to a trigger for reading or writing data targeting the disk drive device.

9. A storage system in accordance with claim 1, further comprising:
a storage control module connected to the host computer and the disk drive device, the storage control module being configured to control the disk drive device according to a request from the host computer, wherein
the result obtaining module is provided in the storage control module, and
the test instruction module and the operation information obtaining module are provided in the disk drive device.

10. A method of controlling a storage system comprising a disk drive device having a data read/writable storage area, the storage system providing a host computer with the data read/writable storage area, the disk drive device having a testing module configured to execute a testing process for operation of the disk drive device, the method comprising the steps of:
(A) obtaining operation information including an operating history of the disk drive device;
(B) executing a timing determination process for issuing an instruction to execute the testing process;
(C) sending an instruction to execute the testing process to the testing module according to the timing that has been determined; and
(D) obtaining a result of the testing process, wherein
the timing determination process has a first timing mode for determining a first timing to issue an instruction to execute the testing process, based on a first operation information which is at least part of the operation information that includes the operating history of the disk drive device, and
the step (B) includes executing the timing determination process in the first timing mode.

11. A method in accordance with claim 10, wherein
the timing determination process also has a second timing mode for determining a second timing to issue an instruction to execute the testing process, the second timing being different from the first timing, and
the step (B) includes the steps of:
responsive to a trigger for selection of the timing mode:
determining whether or not a given first timing condition is satisfied by second operation information which is at least part of the operation information;
(i) when the first timing condition is met, determining the timing according to the first timing mode; and
(ii) when the first timing condition is not met, determining the timing according to the second timing mode.

12. A method in accordance with claim 10, wherein
the operation information further includes an operating state of the disk drive device,
the disk drive device has a plurality of operating modes including an up operating mode and a down operating mode,
in the up operating mode, the disk drive device operates in a state closer to a state when the disk drive device is reading or writing data than in the down operating mode,
the method further includes the steps of:
(E) responsive to a reference request for the result of the testing process, determining whether or not the current operating mode of the disk drive device is the up operating mode;
(F) when the operating mode is the up operating mode, sending an instruction to execute the testing process to the testing module so as to obtain a new testing process result and providing the new testing process result;
(G) when the operating mode is not the up operating mode, determining whether or not a given executable condition is satisfied by third operation information which is at least part of the operation information, and which includes information of the current operating mode of the disk drive device;
(H) when the executable condition is met, sending an instruction to execute the testing process to the testing module so as to obtain a new testing process result and providing the new testing process result that have been obtained; and
(I) when the executable condition is not met, providing a test result that has already been obtained, without sending an instruction to execute the testing process to the testing module.

13. A method in accordance with claim 10, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes a down-trigger by which the disk drive device operating mode is moved from the up operating mode to the down operating mode,
the timing determination process has a down timing mode as the first timing mode, the down timing mode including determining a timing responsive to the down-trigger, so that the testing process is carried out by the testing module before the operating mode shifts, and
the step (B) includes executing the timing determination process according to the down timing mode.

14. A method in accordance with claim 10, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes an up-trigger by which the disk drive device operating mode is moved from the down operating mode to the up operating mode,
the timing determination process has an up timing mode as the first timing mode, the up timing mode including determining a timing responsive to the up-trigger, so that the testing process is carried out by the testing module after the operating mode shifts, and
the step (B) includes executing the timing determination process according to the up timing mode.

15. A method in accordance with claim 10, wherein
the first operation information includes a trigger for starting a reading or writing operation targeting the disk drive device,
the timing determination process has an access timing mode as the first timing mode,
the access timing mode includes determining a timing after receiving a given trigger for confirming of necessity of a testing process instruction, and then receiving the trigger for starting a reading or writing operation targeting the disk drive device, and
the step (B) includes executing the timing determination process according to the access timing mode.

16. A method in accordance with claim 10, wherein
the timing determination process has a status-execute timing mode as the first timing mode,
the status-execute timing mode includes the steps of:
 determining whether or not the first operation information meets a given status-execute condition, responsive to a given trigger for confirming of necessity of issuing a testing process instruction;
 (i) when the status-execute condition is met, determining that a timing to issue an instruction to execute the testing process has come, and
 (ii) when the status-execute condition is not met, waiting until a next trigger for confirming of necessity of issuing a testing process instruction without determining a timing for issuing an instruction to execute the testing process, wherein
the step (B) includes executing the timing determination process according to the status-execute timing mode.

17. A method in accordance with claim 10, wherein
the disk drive device has a plurality of operating modes including an up operating mode and a down operating mode,
in the up operating mode, the disk drive device operates in a state closer to a state when the disk drive device is reading or writing data than in the down operating mode,
the first operation information includes a trigger for reading/writing targeting the disk drive device and information of current operating mode of the disk drive device, and
the timing determination process has a status-determination mode as the first timing mode,
the status-determination mode includes the steps of:
 responsive to a given trigger for confirming of necessity of a testing process instruction, determining whether or not the current operating mode of the disk drive device is the down operating mode;
 (E) when the operating mode is not the down operating mode, determining that a timing to issue an instruction to execute the testing process has come;
 (F) when the operating mode is the down operating mode, determining whether or not a given status-determination condition is satisfied by the first operation information;
 (G) when the status-execute condition is met, determining that a timing to issue an instruction to execute the testing process has come; and
 (H) when the status-determination condition is not met, suspending determining a timing, and determining a timing responsive to a trigger for reading or writing data targeting the disk drive device, wherein
the step (B) includes executing the timing determination process according to the status-determination mode.

18. A method in accordance with claim 10, wherein
the storage system further comprises a control module configured to control the disk drive device,
the control module comprises:
 a drive control module provided in the disk drive device, the drive control module being configured to control the disk drive device; and
 a storage control module connected to the host computer and the drive control module, the storage control module being configured to control the disk drive device according to a request from the host computer, wherein
the steps (A), (B), and (C) are executed by the drive control module, and
the step (D) is executed by the storage control module.

19. A storage system for providing a host computer with a data read/writable storage area, comprising:
a disk drive device having a storage area and a testing module configured to execute a testing process for operation of the disk drive device;
a test instruction module configured to send an instruction to execute the testing process to the testing module;
a result obtaining module configured to obtain a result of the testing process; and
an operation information obtaining module configured to obtain operation information related to at least one of an operating state of the disk drive device and an operating history of the disk drive device,
wherein,
the test instruction module has a first timing mode for determining a first timing to issue an instruction to execute the testing process, based on a first operation information which is at least part of the operation information,
the disk drive device has a plurality of operating modes including an up operating mode and a down operating mode,
in the up operating mode, the disk drive device operates in a state closer to a state when the disk drive device is reading or writing data than in the down operating mode, and
responsive to a reference request for the result of the testing process, the result obtaining module
determines whether or not the current operating mode of the disk drive device is the up operating mode,
 (A) when the operating mode is the up operating mode, sends an instruction to execute the testing process to the testing module so as to obtain a new testing process result and provides the new testing process result,
 (B) when the operating mode is not the up operating mode, determines whether or not a given executable condition is satisfied by third operation information which is at least part of the operation information, and which includes information of the current operating mode of the disk drive device, (B1) when the executable condition is met, sends an instruction to execute the testing process to the testing module so as to obtain a new testing process result and provides the new testing process result that have been obtained, and (B2) when the executable condition is not met, provides a test result that has already been obtained according to the instruction from the test instruction module, without sending an instruction to execute the testing process to the testing module.

20. A storage system in accordance with claim 19, further comprising:
a storage control module connected to the host computer and the disk drive device, the storage control module being configured to control the disk drive device according to a request from the host computer, wherein
the result obtaining module is provided in the storage control module, and
the test instruction module and the operation information obtaining module are provided in the disk drive device.

* * * * *